United States Patent
Goertzel et al.

(10) Patent No.: US 6,308,273 B1
(45) Date of Patent: Oct. 23, 2001

(54) METHOD AND SYSTEM OF SECURITY LOCATION DISCRIMINATION

(75) Inventors: Mario C. Goertzel, Kirkland; Susi E. Strom, Redmond; Praerit Garg, Kirkland; Bharat Shah, New Castle, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/096,676

(22) Filed: Jun. 12, 1998

(51) Int. Cl.$^7$ .................................................. G06F 12/14
(52) U.S. Cl. .......................................... 713/201; 713/202
(58) Field of Search ..................................... 713/200, 201, 713/202

(56) References Cited

U.S. PATENT DOCUMENTS

| | | | |
|---|---|---|---|
| 4,962,449 | * 10/1990 | Schlesinger | 713/200 |
| 5,138,712 | 8/1992 | Corbin . | |
| 5,276,901 | 1/1994 | Howell et al. . | |
| 5,321,841 | 6/1994 | East et al. . | |
| 5,390,247 | 2/1995 | Fischer . | |
| 5,412,717 | 5/1995 | Fischer . | |
| 5,506,961 | 4/1996 | Carlson et al. . | |
| 5,542,046 | 7/1996 | Carlson et al. . | |
| 5,638,448 | * 6/1997 | Nguyen | 380/29 |
| 5,649,099 | 7/1997 | Theimer et al. . | |

(List continued on next page.)

FOREIGN PATENT DOCUMENTS

| | | |
|---|---|---|
| 0 398 645 | 11/1990 | (EP) . |
| 0 465 016 | 1/1992 | (EP) . |
| 0 588 415 | 3/1994 | (EP) . |
| 0 697 662 | 2/1996 | (EP) . |
| 0 813 133 | 12/1997 | (EP) . |
| WO 96/05549 | 2/1996 | (WO) . |
| WO 96/13113 | 5/1996 | (WO) . |
| WO 97/15008 | 4/1997 | (WO) . |
| WO 97/26734 | 7/1997 | (WO) . |

OTHER PUBLICATIONS

Anonymous, "Apache suEXEC Support," (describes the Apache HTTP Server Version 1.3 dating from Jun. 5, 1998 as documented in Written Opinion for PCT Application No. PCT/US99/12912), http://www.apache.org/docs/suexec.html printed Jul. 24, 2000.

Anonymous, "Apache Virtual Host documentation," (describes the Apache HTTP Server Version 1.3 dating from Jun. 5, 1998 as documented in Written Opinion for PCT Application No. PCT/US99/12912), http://www.apache.org/docs/vhosts/index.html, printed Jul. 24, 2000.

(List continued on next page.)

*Primary Examiner*—Robert Beausoleil
*Assistant Examiner*—Bryce P. Bonzo
(74) *Attorney, Agent, or Firm*—Michalik & Wylie, PLLC

(57) ABSTRACT

An improved computer network security system and method wherein access to network resources is based on information that includes the location of the connecting user. In general, the less trusted the location of the user, the more the access rights assigned to the user are restricted. A discrimination mechanism and process determines the location of a user with respect to categories of a security policy, such as to distinguish local users, intranet users and dial-up users from one another. Based on information including the location and the user's credentials, an access token is set up that may restrict the user's normal access in accordance with the security policy, such as to not restrict a user's processes beyond the user-based security information in the user's normal access token, while further restricting the same user's access to resources when connecting via a dial-up connection. Restricted tokens are preferably used to implement the location-based discrimination by restricting the security context of users connecting from less trusted locations.

43 Claims, 18 Drawing Sheets

U.S. PATENT DOCUMENTS

| | | | |
|---|---|---|---|
| 5,675,782 | | 10/1997 | Montague et al. . |
| 5,678,041 | | 10/1997 | Baker et al. . |
| 5,680,461 | | 10/1997 | McManis . |
| 5,682,478 | | 10/1997 | Watson et al. . |
| 5,745,676 | | 4/1998 | Hobson et al. . |
| 5,757,916 | * | 5/1998 | MacDoran ............................. 380/25 |
| 5,761,669 | | 6/1998 | Montague et al. . |
| 5,812,784 | | 9/1998 | Watson et al. . |
| 5,826,029 | | 10/1998 | Gore et al. . |
| 5,845,067 | | 12/1998 | Porter et al. . |
| 5,922,073 | * | 7/1999 | Shimada ............................... 713/200 |
| 5,925,109 | | 7/1999 | Bartz . |
| 5,940,591 | * | 8/1999 | Boyle ................................... 713/201 |
| 5,941,947 | | 8/1999 | Brown et al. . |
| 5,949,882 | | 9/1999 | Angelo . |
| 5,983,270 | * | 11/1999 | Abraham .............................. 709/240 |
| 5,983,350 | * | 11/1999 | Minear ................................. 713/201 |
| 6,081,807 | | 6/2000 | Story et al. . |
| 6,105,132 | * | 8/2000 | Fritch .................................. 713/167 |

OTHER PUBLICATIONS

Bell Telephone Laboratories Incorporated, UNIX™ Time–Sharing System: *UNIX Programmer's Manual,* 7th Edition, vol. 1, Chmod(1), Su(1), Exec(2) (Jan. 1979).

"Java Security Model: Java Protection Domains," http://java.sun.com/security/handout.html, printed Nov. 11, 1999.

Anon, "Privilege Control Mechanism for UNIX Systems," *IBM Technical Disclosure Bulletin,* vol. 34, No. 7b pp. 477–479, Dec. 1991.

Erdos et al., "Security Reference Model for the Java Developer's Kit 1.0.2," *Java Security Reference Model,* Nov. 13, 1996, http://www.javasoft.com/security/SRM.html printed Jul. 14, 1999.

Fritzinger et al., "Java Security," 1996, http://java.sun.com/security/whitepaper.txt.

Fritzinger et al., "Java Security," 1996, http://java.sun.com/security/whitepaper.ps.

Goldberg et al., "A Secure Environment for Untrusted Helper Applications: Confining the Wily Hacker," *Sixt USENIX Security Symposium,* Jul. 22–25, 1996, http://www.usenix.org/publications/library/proceedings/sec9.

Goldstein, Ted, "The Gateway Security Model in the Java Commerce Client," *The Source for Java ™Technology,* 1997, http://www.java.sun,com/products/commerce/docs/whitepapers/security/JCC_gateway,html printed Jul. 14, 1999.

Mazieres, David and M. Frans Kaashoek, "Secure Applications Need Flexible Operating Systems," 6th Workshop on Hot Topics in Operating Systems (HotOS–VI), May 5–6, 1997, http://www.eecs.harvard.edu/hotos/.

Neuman et al., "Kerberos: An Authentication Service for Computer Networks," *IEEE Communicaitons Magazine,* pp. 33–38, Sep. 1, 1994.

Copy of International Search Report in Corresponding PCT Application No. PCT/US99/12913.

Soshi et al., *The Saga Security System: A Security Architecture for Open Distributed Systems,* IEEE, pp. 53–58 (1997).

Asche, Ruediger R., "The Guts of Security", pp. 1–19 (May 9, 1995), *http://msdn.microsoft.com/library/techart/medn secguts.htm,* printed May 28, 2001.

Asche, Ruediger R., "Windows Security in Theory and Practice", pp. 1–10 (May 9, 1995), *http://msdn.microsoft.com/library/techart/medn seccpp.htm,* printed May 28, 2001.

Frost, J., "Windows NT Security", pp. 1–6 (May 4, 1995), *http://world.std.com/~jimf/papers/nt–security/nt–security.html,* printed May 28, 2001.

* cited by examiner

METHOD AND SYSTEM OF SECURITY LOCATION DISCRIMINATION

FIELD OF THE INVENTION

The invention relates generally to computer systems, and more particularly to an improved security model for computer systems.

BACKGROUND OF THE INVENTION

Current computer security systems determine a user's access to network resources based on permissions granted according to the user's credentials. This user-centric model provides a great deal of flexibility for the increasingly mobile/remote user population. For example, remote access servers and Internet connectivity allow a user to transparently access corporate resources from virtually anywhere.

While this flexibility provides advantages to both the user and the owner of the network, (e.g., a corporate enterprise), such increased availability and easy connectivity inherently elevates the risk of unauthorized access. Although encrypted network communication prevents wire eavesdropping, allowing remote access to sensitive corporate resources still has an intrinsic risk. Indeed, regardless of how protected the resources (such as files) are when they are transmitted, there is still likely to be a subset of sensitive corporate resources that the company does not want authorized users to be accessing from just anywhere.

For example, a laptop-computer user may inadvertently display highly confidential corporate strategy to unintended viewers, such as when working on an airplane. New, wider-angle laptop screens make it even more difficult to prevent other passengers from peering at the monitor contents. Similarly, with the escalating population of mobile users, the theft or loss of a notebook computer increasingly threatens the security of sensitive corporate data. A user's account and password also may be stolen, particularly if maintained on a stolen laptop. As long as the user has the proper credentials, existing security mechanisms make it simple to remotely download files and perform other remote actions, thus contributing to these and other security risks.

In short, remote access servers (RAS) and Internet connectivity enable users to access corporate resources from virtually any location. However, certain locations (particularly remote locations) are less secure than others. For example, because of portability and increased access, files downloaded to a laptop computer are easier to steal than files on a desktop machine in a corporate office. Similarly, unauthorized persons may obtain user accounts and passwords, whereby it is most likely that they will attempt to access corporate resources from a remote location.

SUMMARY OF THE INVENTION

Briefly, the present invention provides an improved computer network security system and method wherein access to network resources is based on information that includes the location of the connecting user. Ordinarily, the less trusted the location of the user, the more the access rights assigned to the user are restricted. A discrimination mechanism determines the location of a user with respect to categories of a security policy, such as to distinguish local users, intranet users and dial-up users from one another. A security provider establishes the access rights of the user such as by setting up an access token for the user based on information including the location and the user's credentials. An enforcement mechanism uses the access rights set up for the user to determine whether to grant or deny accesses to resources. The location-based access rights may be restricted with respect to the user's normal access rights in accordance with the security policy. For example, the processes of a local user may not be restricted beyond the user-based security information in the user's normal access token, while the same user connecting via a dial-up connection will have restricted processes. Preferable, restricted tokens are used to implement the location-based discrimination by restricting the access of users connecting from less trusted locations.

Other objects and advantages will become apparent from the following detailed description when taken in conjunction with the drawings, in which:

DETAILED DESCRIPTION

Exemplary Operating Environment

Figure 1:
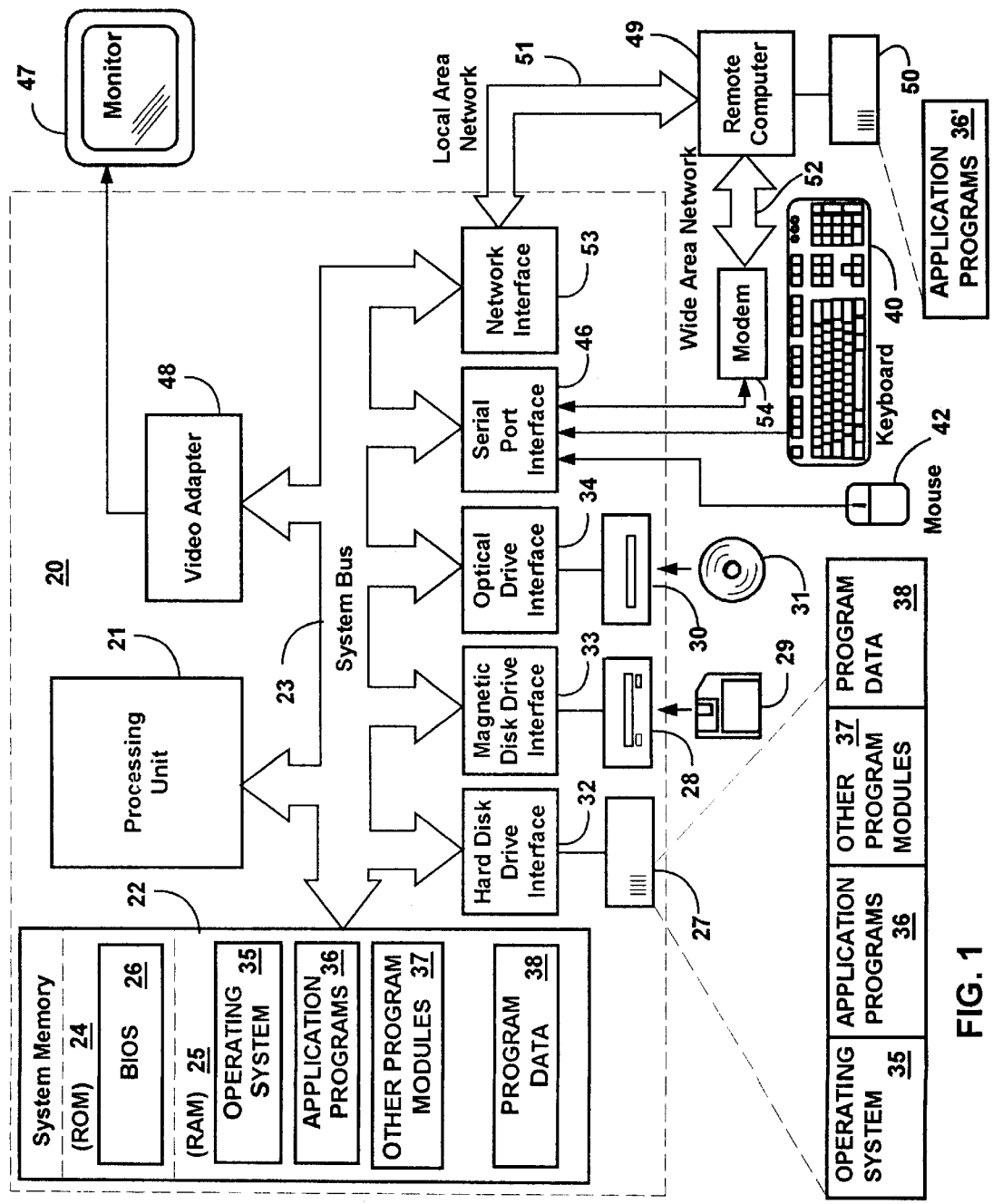
FIG. 1 is a block diagram representing a computer system into which the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a personal computer. Generally, program modules include routines, programs, objects, components, data structures and the like that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (preferably Windows NT), one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Location Discrimination

In accordance with one aspect of the present invention, there is provided a method and system that determines access to resources based on the location of a user, (in addition to the user's normal access rights based on the user's credentials). For example, valid users determined to be at a at a local, secure location are given their full access rights, while those at a remote location are given restricted access rights. Moreover, the amount of restriction may vary based on the type of remote access.

Figure 2:
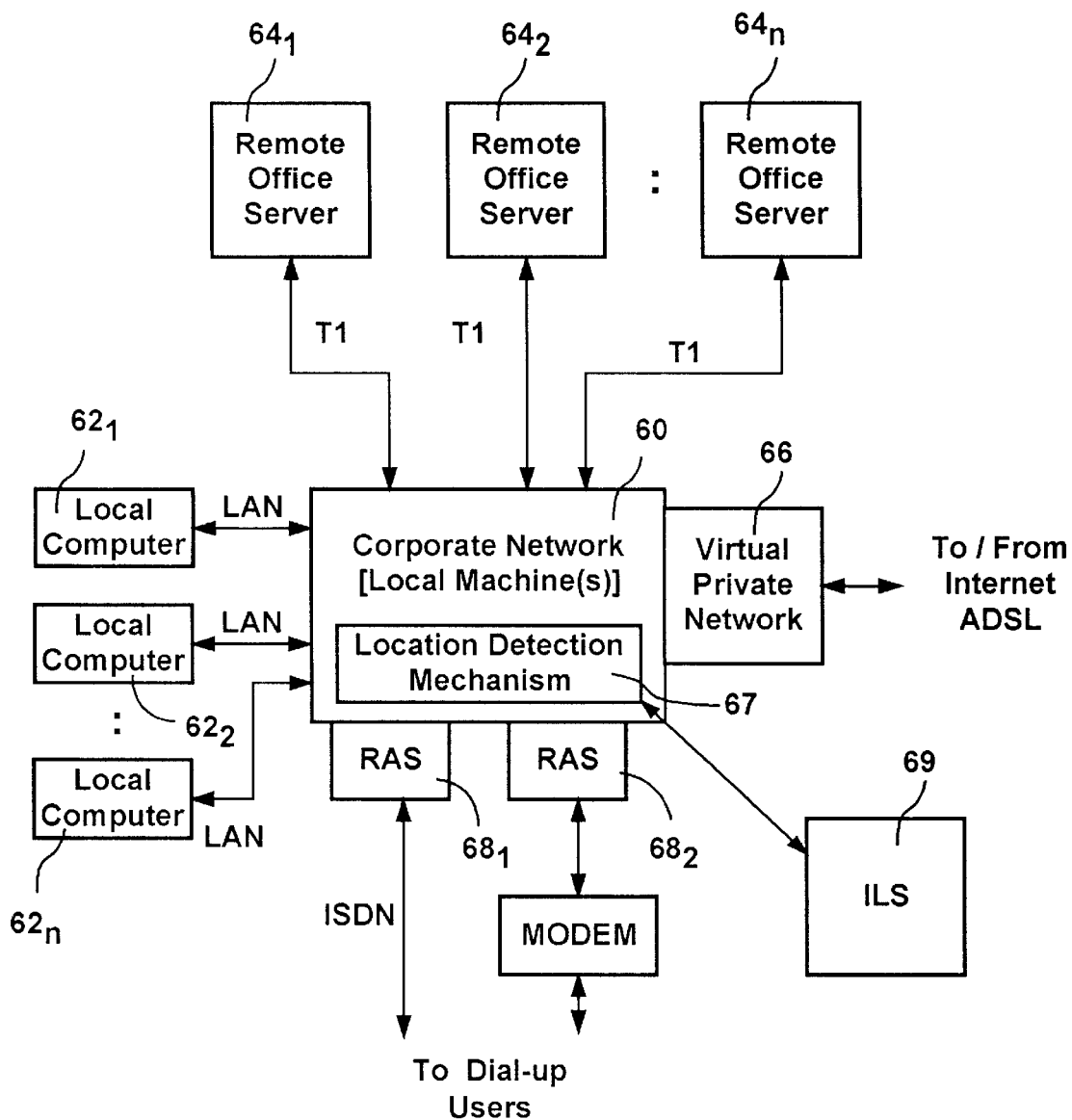
FIG. 2 is a block diagram generally representing virtual locations from which a user may connect to a network.

By way of example, FIG. 2 shows a number of locations from which a user may connect to a corporate network (comprising local machine or machines) 60. Users may connect through computers $62_1$–$62_n$ via a local area network (such as LAN 51 and network interface 53 as shown in FIG. 1). Other users may connect through remote office servers $64_1$–$64_n$, e.g., via a T1 connection, while others may be connected through the Internet via a virtual private network (VPN) 66. Still other users may connect through any number of remote access servers (e.g., $68_1$–$68_2$), and in numerous other ways from other locations (not shown).

In keeping with the invention, the level of access granted to a user for accessing network resources is dependent on the (virtual) location from where a given user is connected. For example, users connected to the local machine 60 via a LAN $62_1$ may be given their full access rights, users through a remote office $64_1$ somewhat restricted rights, and users through RAS $68_1$, $68_2$ or the VPN 66 substantially restricted access rights.

As can be readily appreciated, as used herein, the term "location" is a logical concept related to the type of location connection rather than a physical concept related to the distance from which the connection is originating. For example, a user can connect to the network 60 via the RAS $68_2$ from virtually any physical location that has any type of telephone service. Similarly, a user may connect from an "Intranet" location that may be relatively far (physically) from the local machine 60. Indeed, a RAS $68_1$, $68_2$ dial-up user may be closer in physical distance than user at a remote office $64_1$ connecting via a T1 line, even though the dial-up user will ordinarily be considered less secure. As such, as used herein, each location from which a user may connect is considered a virtual location rather than a physical place. Notwithstanding, the present invention may also further operate with some regard to physical location if the user's physical location is actually known (e.g., via caller ID, the invention may further restrict access to all RAS users calling from a certain area code).

To accomplish location discrimination, there is provided (e.g., in the network machines 60) a mechanism/process 67 for reliably determining the location of a user. Note that the mechanism/process 67 may comprise various components in one machine or distributed among numerous machines in the network. Moreover, as described herein, there are two different mechanisms for IP address location discrimination. A first is based on an Internet Location Service (ILS) 69, while the other is based on assigning ranges of IP addresses (administrated preferably via the directory services) to clients in various locations, and using trusted routers to prevent the use of a more trusted IP address from a less trusted location. Both approaches work on any network with a routing mechanism and well-defined, trusted access points.

Figure 3:
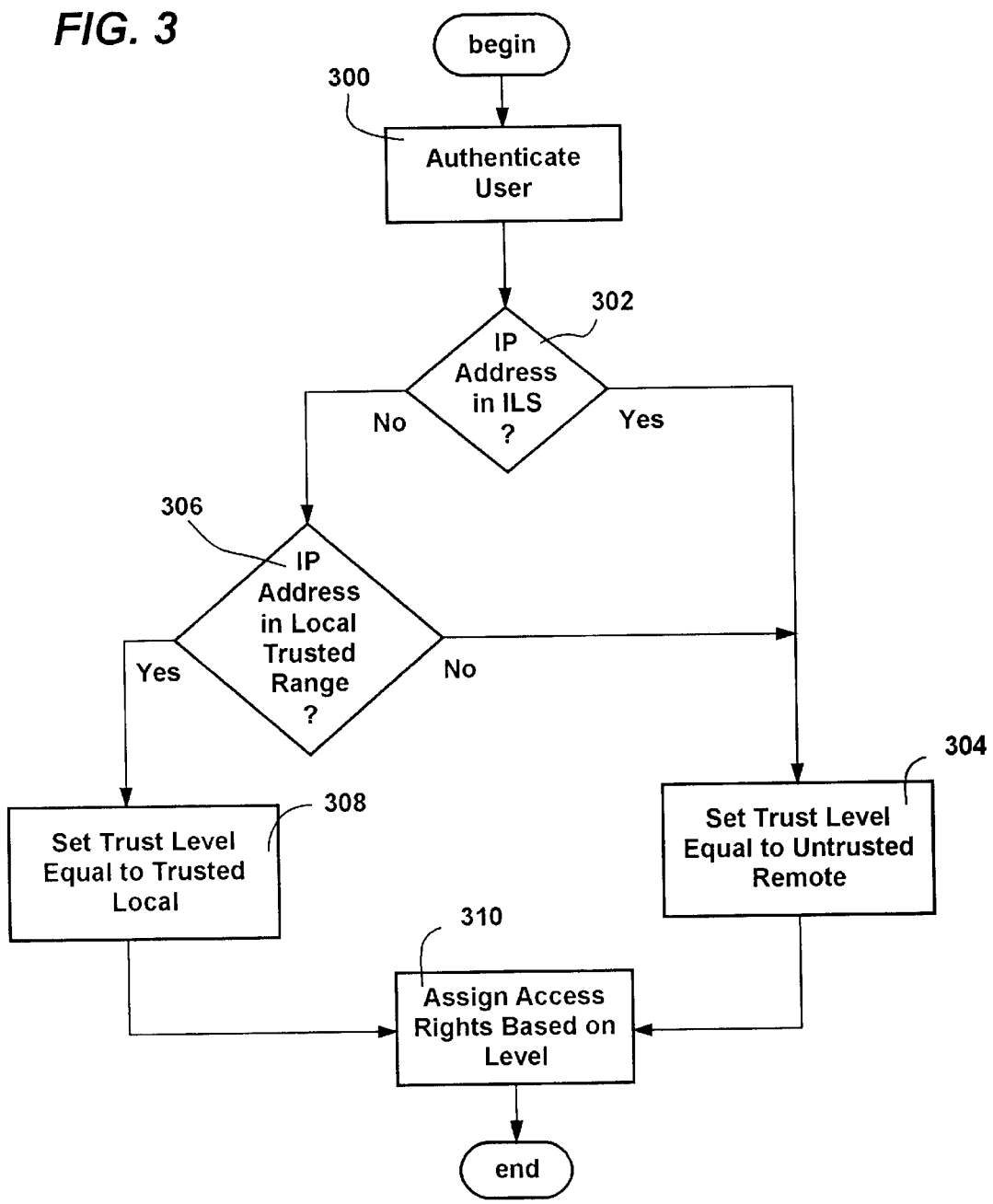
FIG. 3 is a flow diagram representing the general steps taken to determine the user's location and access level of a user based on that location in accordance with one aspect of the present invention.

A first (ILS) way to determine if a user is not in a trusted location is for the mechanism 67 to check to see if the user is connecting through a remote access server (RAS), and if so, is therefore remote and less trusted. To this end, when RAS authenticates the remote user logon, as represented by step 300 of FIG. 3, RAS assigns the user an Internet Protocol (IP) address and registers this user and IP address with the ILS (Internet Location Service) 69. As shown in the flow diagram of FIG. 3, if the IP address is listed in the ILS (step 302), the user is logged on to through this RAS cluster and is thus untrusted. Such users will be given restricted access, such as by setting a certain reduced access level (step 304) and then using that level to assign (restricted) access rights (step 310), as described in more detail below.

However, if a user's IP address is not listed in the ILS 69 as a RAS IP address, then that user is not necessarily local and trusted. By way of example, if a user logs on through a RAS server in Europe, and then wants access therethrough to a Charlotte (N.C.) domain, the Charlotte RAS ILS does not have the European RAS connection listed with its Local ILS. Accordingly, for a user not listed with a Local ILS 69, additional information is needed to determine the user's location.

One piece of additional information is the assigned IP address, which is evaluated at step 306. If the IP address is not within the range of local, trusted, IP addresses assigned by the local machine, then the user is not local. Accordingly, the mechanism/process 67 at step 306 will branch to step 304 where the level is set to untrusted as described above. If however the address is within the range of local, trusted, IP addresses, then the user is local but has not connected via RAS, and thus is trusted. Such users will be given normal access, such as by assigning the user a trusted access level (step 308) and then using that level to assign access rights (step 310), as described in more detail below.

Note that the full routing path for a connection is available to a server, and thus when determining the location, access is assigned based upon the least trusted location (i.e., the "weakest link") through which a user's packets are being routed. Moreover, when an IP address is not in a range of "untrusted" locations, it is not assumed to be within a trusted range, but rather location discrimination is inclusive rather than exclusive in nature, i.e., a list of trusted IP ranges is tested for assigning levels rather than assigning levels by omission from a list of untrusted locations.

It should be noted that, like other electronic security systems, in general, the level of care with which the present invention is used is also responsible for the overall security results. For example, care should be taken when segregating a network with different trust levels, items should be routed appropriately, internal procedures should not allow someone, for example, to install a RAS server on a desktop machine in the corporate office for personal use, and so on.

The above example provides a simplified, two-level local discrimination mechanism 67. However, for finer grained multiple trust level control, IP addresses may be assigned by servers in ranges that correspond to additional location information as to the location from which the user is connecting. RAS servers may be further arranged with a location discrimination mechanism 71 to assign IP addresses in one range for callers from "authorized" phone number, and another range for anonymous or unregistered phone numbers. Note that the mechanism/process 71 may include the same or similar components to the mechanism/process 67 described above, along with additional components, and may be within one machine or distributed among numerous machines in the network. However, in addition to providing finer granularity, maintaining a trusted IP Address range at the domain server takes less time to query than checking with the ILS 69. Moreover, as will become apparent below, to accomplish overall security, there are generally three parts of the mechanism, including a global database of address to location mappings, trusted address assignment and secure routers/gateways.

The following table sets forth trust levels and IP address ranges which may be assigned to a user based on some policy arbitrarily set up for a hypothetical enterprise. Note that users connecting directly (e.g., via a LAN interface card 53) to the local machine are level zero trusted.

| Level | Location | IP Address Range |
| --- | --- | --- |
| Trust Level 1 | Local Intranet users | 111.22.0.0–111.22.255.255 |
| | | 111.24.0.0–111.24.127.255 |
| Trust Level 2 | RAS Authorized Users | 111.24.128.255– |
| | | 111.24.255.255 |
| Trust Level 3 | RAS Anonymous Users | 111.25.0.0–111.25.255.255 |

Figure 4:
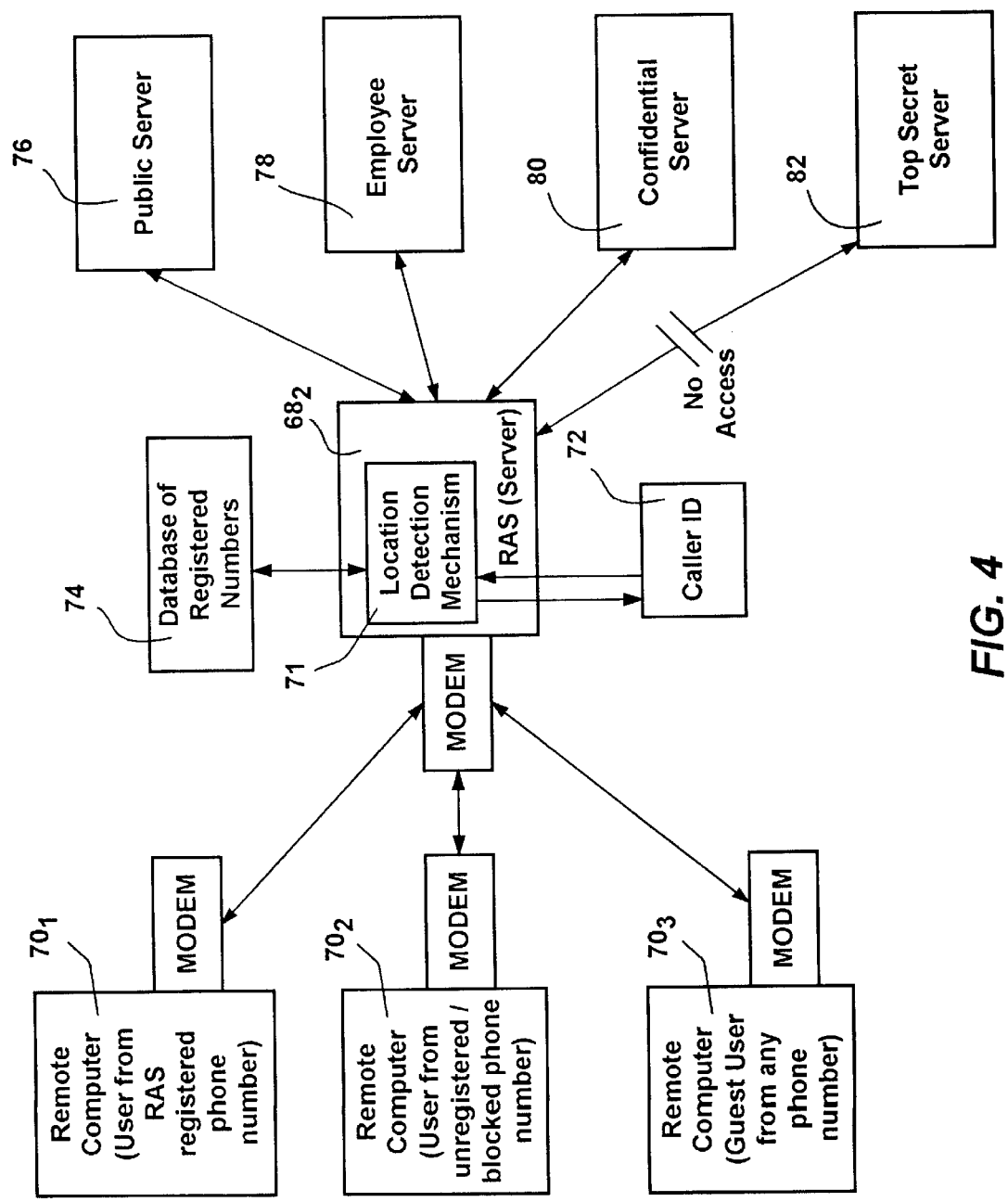
FIG. 4 is a block diagram generally representing the various components for establishing user access based on location information in accordance with one aspect of the present invention.

By way of example, FIG. 4 shows three different types of user connections via which users connect to a RAS server (e.g., $68_2$). A first user connects a remote computer $70_1$ to the RAS server $68_2$ by dialing in from a RAS-registered phone number, a second user from a remote computer $70_2$ via an unregistered or blocked telephone number, and a third user from any phone number. The first two users have user credentials alleging that they are authorized users of the system, while the third user is not claiming to be an authorized user but is instead only attempting to connect as a guest. To determine the access level, the RAS server $68_2$ first determines the telephone number of the calling computer via caller ID 74. If a telephone number is available (e.g., not blocked by the caller), the RAS server $68_2$ queries a database (or table) 72 that maintains a list of registered telephone numbers that are allowed increased access to resources.

In this manner, the user of the remote computer $70_1$ calling from a registered number may be given greater access to resources than the user of the remote computer $70_2$ calling from an unregistered or blocked telephone number. Moreover, both may have more access rights than a guest user $70_3$ regardless of that user's telephone number. For example, the user of the remote computer $70_3$ may be only allowed access to files on a public server 76, while the user computer $70_2$ calling from the unregistered number may have access to the public server 76 and an employee server 78. Lastly, the user computer $70_1$ calling from the registered number may have access to the public server 76, employee server 78 and a confidential server 80, yet still may not have access to a top secret server 82. Such distinctions enable an enterprise to set up any number of access policies. As can be readily appreciated, with the above example, traveling employees would be able to call in from an unregistered location and access some employee-level files, (further restricted by their user-credentials), but not confidential files. Confidential files could only be accessed from a user's home or other known location that has a registered telephone number, while top secret files are not accessible via any RAS connection.

Figure 5A:
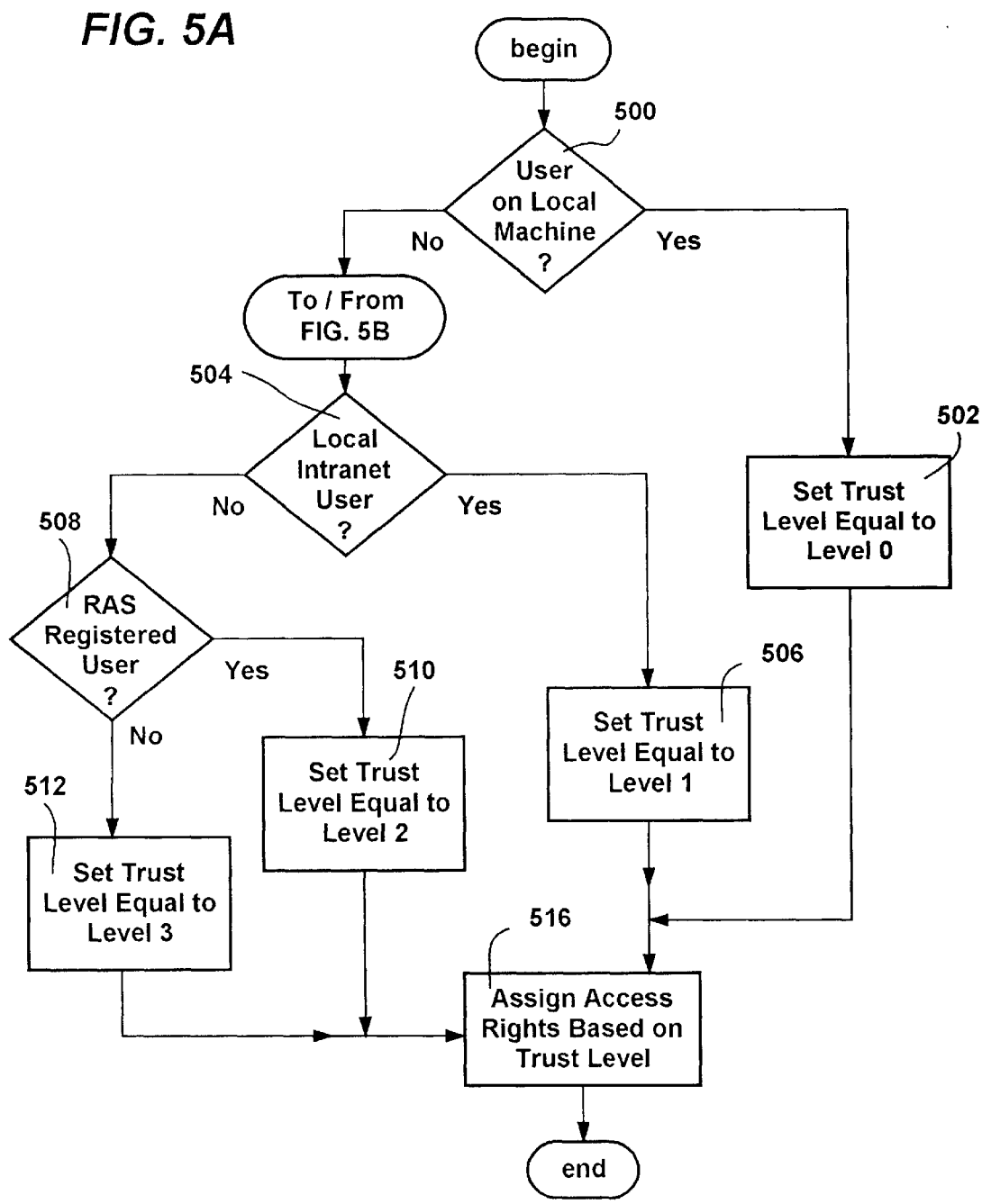
FIGS. 5A–5B comprise a flow diagram representing the general steps taken to determine a user's level of trust based on location information in accordance with one aspect of the present invention.
Figure 5B:
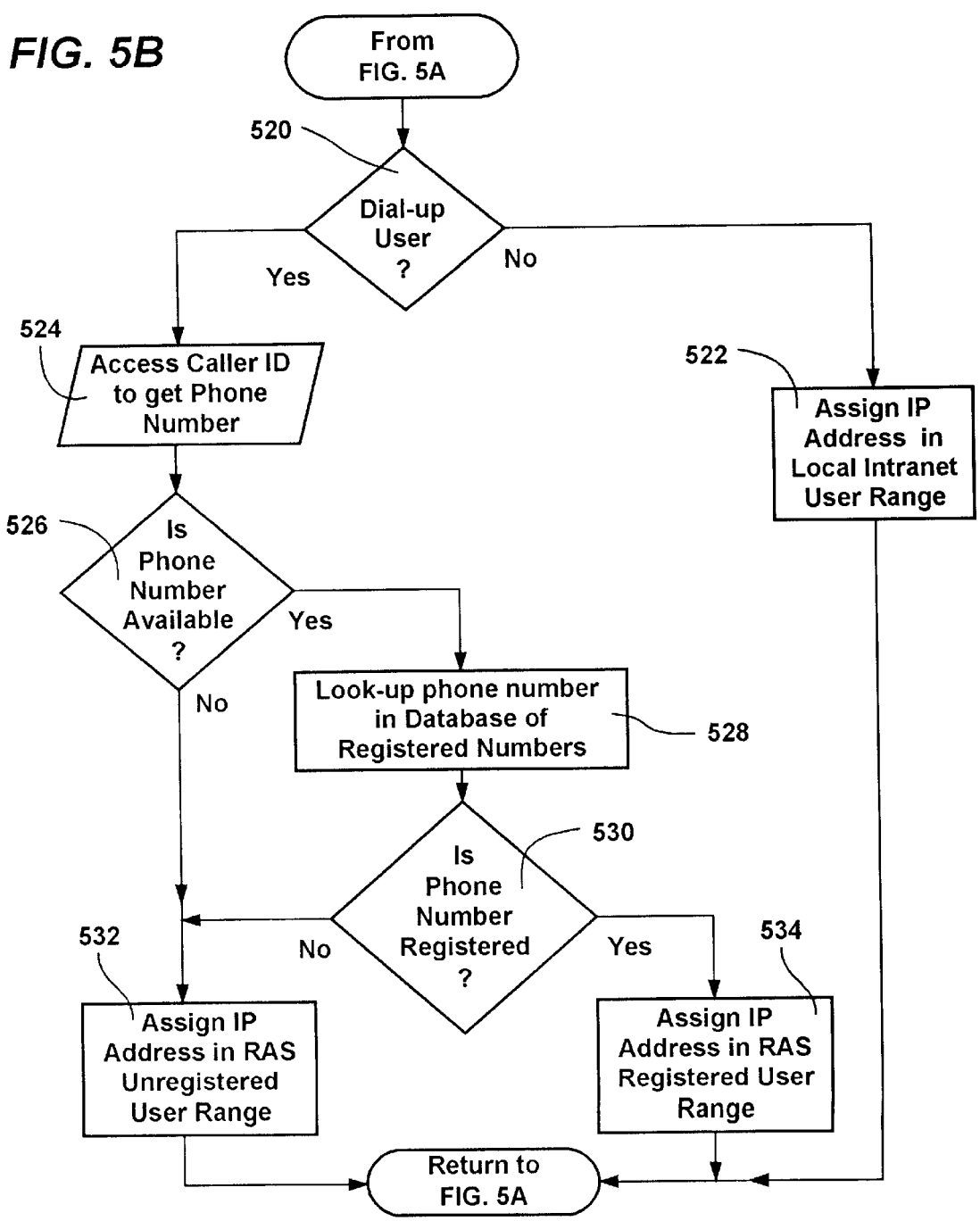

To summarize, FIGS. 5A–5B comprise an exemplary flow diagram showing how access levels may be assigned according to a predetermined policy. If at step 500 of FIG. 5A a user is connecting via the local machine 60, the trust level is set to zero at step 502, which then continues to step 516 where access rights are assigned based (in part) on the trust level. If not connecting via the local machine, however, the process/mechanism 71 continues to FIG. 5B wherein the type of remote connection determines the trust level via an assigned IP address. If at step 520 of FIG. 5B, the user is not connecting via a dial-up connection, then step 520 branches to step 522 wherein the IP address assigned to the user is in the range of addresses reserved for Local Intranet users. Note that in this simplified example, a user either connects directly to the local machine, via an Intranet connection or via a dial-up connection.

If however step 520 detects that the user is connecting via a dial-up connection, step 520 branches to step 524 to determine the telephone number from which the connection is being made. As can be appreciated, this information may be made available via a caller ID mechanism 72 or the like. Step 526 tests to determine if the telephone number is available, since there is a possibility that the user blocked the caller ID function when originating the call, or possibly that the calling telephone is not capable of activating the feature (e.g., the calling phone is out of a caller ID-equipped area). Note that if the mechanism 72 is capable of distinguishing between intentionally blocked calls or simply not detectable calls, if desired, a policy may discriminate between the two types to set a different trust level. However, in the example herein, if the telephone number is not available regardless of the reason, then step 526 branches to step 532 where an IP address is assigned in the RAS unregistered user range.

If instead the number is available at step 526, step 528 is executed, which uses the number to query the database 74 or the like to determine whether the number is registered as that of a predetermined trusted location. Note that the location information may be optionally combined with the user identity at this time, e.g., a user identified as UserX will be given increased access if calling from his or her registered home number, but no other user will receive increased access if calling from that number.

If the number is appropriately registered as determined by step 530, then step 530 branches to step 534 where an IP address is assigned in the RAS registered user range for the calling computer. Otherwise, step 530 branches to step 532 where an IP address is assigned in the RAS unregistered user range. The location discrimination process/mechanism 71 then returns to step 504 of FIG. 5A where the assigned addresses will be evaluated by the machine that determines access rights.

At step 504, if the IP address is in the range of local intranet users, then step 504 branches to step 506 wherein the trust level is set to one for this user. If not in the range of local intranet users, step 508 tests to determine if the range is within the range of RAS registered users. If so, the trust level is set to two at step 510, while if not, the trust level is set to three at step 512. Once the trust level is set to a level from zero to three, the process then continues to step 516 wherein access rights are assigned based on the trust level of the user in combination with the user's credentials, as described in more detail below.

Figure 6:
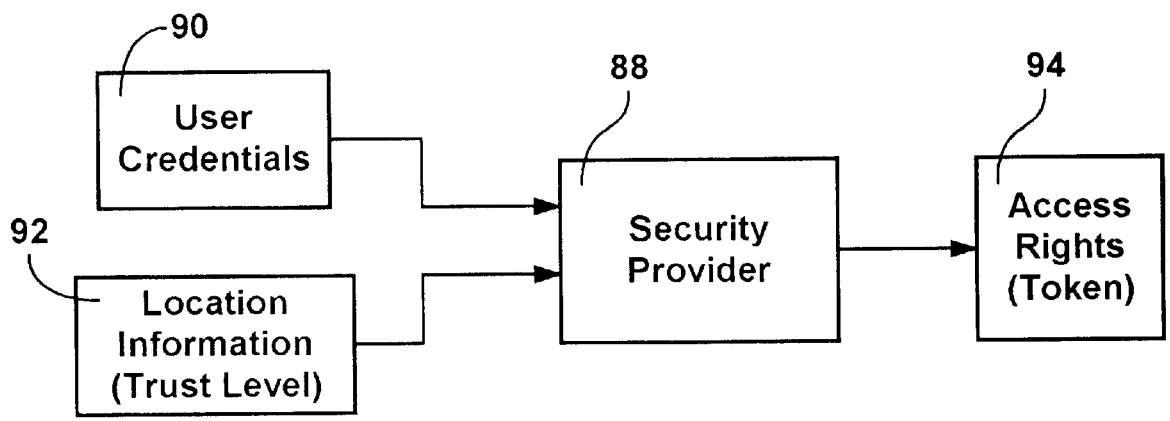
FIG. 6 is a block diagram generally representing a mechanism determining a user's access rights in accordance with an aspect of the present invention.

FIG. 6 generally shows the logic for determining access rights in accordance with the present invention. A security provider 88 takes the user credentials 90 and the location information (e.g., the trust level) 92 and determines the access rights 94 for the user based on that information. As described below, in a preferred embodiment, the access rights are placed in an access token that is associated with each of the user's processes, and compared against security information associated with each resource to determine access to that resource.

Location Discrimination Using Restricted Tokens

As will become apparent, the present invention is preferably implemented at the operating system level, and thus covers virtually all possible was to access information. By way of example, consider protecting a given file on a server. This file may be accessed in many ways, including remote SMB files access, via a script running on the server, via an FTP server running on the server, via a proxy (third machine), and so on. The present invention operates at the system level, making it possible to protect virtually all ways of accessing the file.

The preferred security model of the present invention that is described herein leverages and extends the existing Windows NT security model. Notwithstanding, there is no intention to limit the present invention to the Windows NT operating system, but on the contrary, the present invention is intended to operate with and provide benefits with any mechanism that in some way can limit access to resources based on input information.

In general, in the Windows NT operating system, a user performs tasks by accessing the system's resources via processes (and their threads). For purposes of simplicity herein, a process and its threads will be considered conceptually equivalent, and will thus hereinafter simply be referred to as a process. Also, the system's resources, including files, shared memory and physical devices, which in Windows NT are represented by objects, will be ordinarily referred to as either resources or objects herein.

When a user logs on to the Windows NT operating system and is authenticated, a security context is set up for that user, which includes building an access token 100. As shown in the left portion of FIG. 7, a conventional user-based access token 100 includes a User And Groups field 102 including a security identifier (Security ID, or SID) 104 based on the user's credentials and one or more group IDs 106 identifying groups (e.g., within an organization) to which that user belongs. The token 100 also includes a privileges field 108 listing any privileges assigned to the user. For example, one such privilege may give an administrative-level user the ability to set the system clock through a particular application programming interface (API). Note that privileges override access control checks, described below, that are otherwise performed before granting access to an object.

Figure 8:
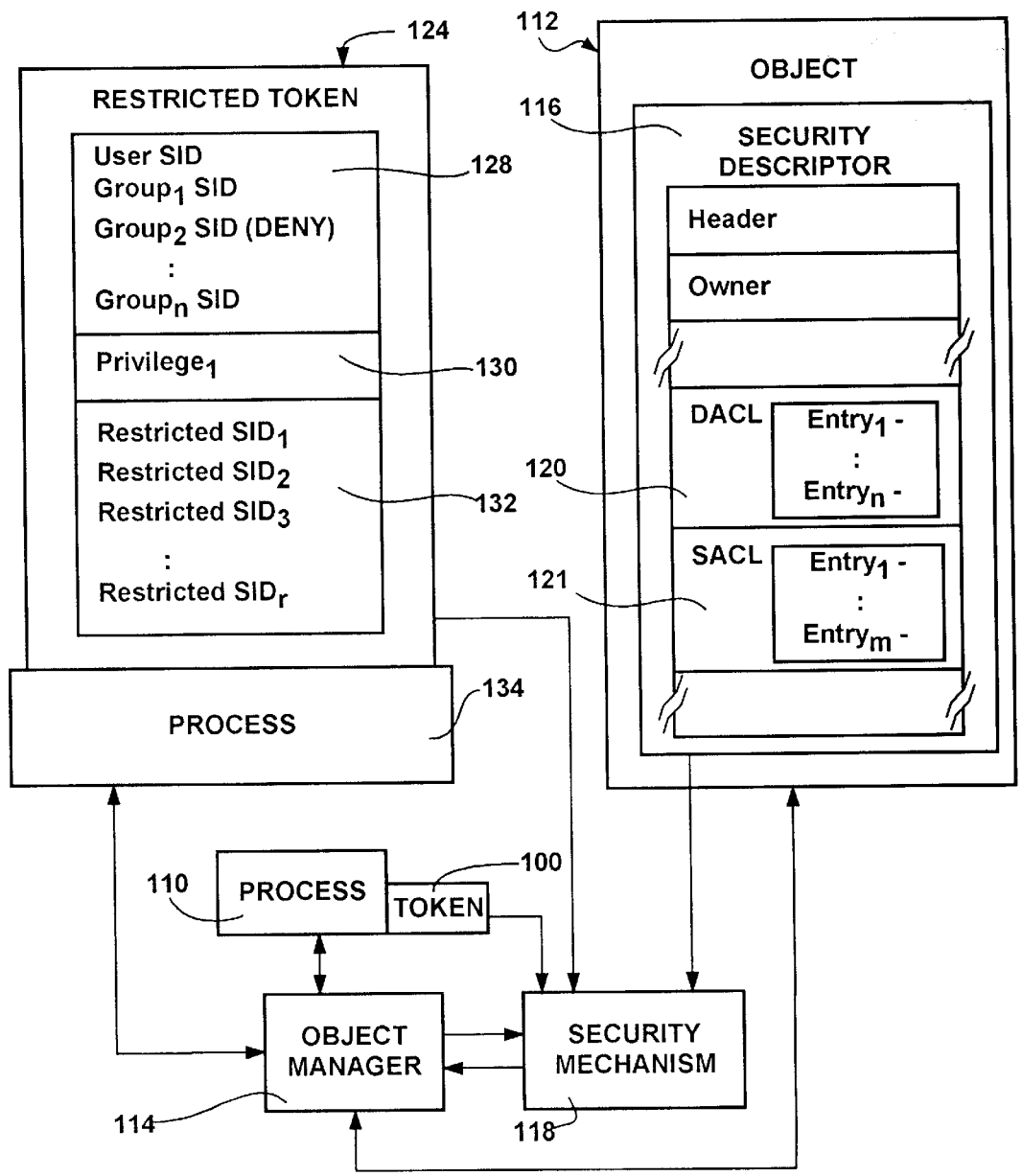
FIG. 8 is a block diagram generally representing the various components for determining whether a process may access a resource.

As will be described in more detail below and as generally represented in FIG. 8, a process 110 desiring access to an object 112 specifies the type of access it desires (e.g., obtain read/write access to a file object) and provides its associated token 100 to an object manager 114. The object 112 has a security descriptor 116 associated therewith, and the object manager 114 provides the security descriptor 116 and the token 100 to a security mechanism 118. The contents of the security descriptor 116 are typically determined by the owner (e.g., creator) of the object, and generally comprise a (discretionary) access control list (ACL) 120 of access control entries, and for each entry, one or more access rights (allowed or denied actions) corresponding to that entry. Each entry comprises a type (deny or allow) indicator, flags, a security identifier (SID) and access rights in the form of a bitmask wherein each bit corresponds to a permission (e.g., one bit for read access, one for write and so on). The security mechanism 118 compares the security IDs in the token 100 along with the type of action or actions requested by the process 110 against the entries in the ACL 120. If a match is found with an allowed user or group, and the type of access desired is allowable for the user or group, a handle to the object 112 is returned to the process 110, otherwise access is denied.

By way of example, a user with a token identifying the user as a member of the "Accounting" group may wish to access a particular file object with read and write access. If the file object has the "Accounting" group identifier of type allow in an entry of its ACL 120 and the group has rights enabling read and write access, a handle granting read and write access is returned, otherwise access is denied. Note that for efficiency reasons, the security check is performed only when the process 110 first attempts to access the object 112 (create or open), and thus the handle to the object stores the type of access information so as to limit the actions that can be performed therethrough.

The security descriptor 116 also includes a system ACL, or SACL 121, which comprises entries of type audit corresponding to client actions that are to be audited. Flags in each entry indicate whether the audit is monitoring successful or failed operations, and a bitmask in the entry indicates the type of operations that are to be audited. A security ID in the entry indicates the user or group being audited. For example, consider a situation wherein a particular group is being audited so as to determine whenever a member of that group that does not have write access to a file object attempts to write to that file. The SACL 121 for that file object includes an audit entry having the group security identifier therein along with an appropriately set fail flag and write access bit. Whenever a client belonging to that particular group attempts to write to the file object and fails, the operation is logged. For purposes of simplicity, auditing will not be described in detail hereinafter, however it can be readily appreciated that the concepts described with respect to access control via restricted SIDs are applicable to auditing operations.

Note that the ACL 120 may contain one or more identifiers that are marked for denying users of groups access(as to all rights or selected rights) rather than granting access thereto. For example, one entry listed in the ACL 120 may otherwise allow members of "Group$_3$" access to the object 112, but another entry in the ACL 120 may specifically deny "Group$_{24}$" all access. If the token 100 includes the "Group$_{24}$" security ID, access will be denied regardless of the presence of the "Group$_3$" security ID. Of course to function properly, the security check is arranged so as to not allow access via the "Group$_3$" entry before checking the "DENY ALL" status of the Group$_{24}$ entry, such as by placing all DENY entries at the front of the ACL 120. As can be appreciated, this arrangement provides for improved efficiency, as one or more isolated members of a group may be separately excluded in the ACL 120 rather than having to individually list each of the remaining members of a group to allow their access.

Note that instead of specifying a type of access, a caller may request a MAXIMUM_ALLOWED access, whereby an algorithm determines the maximum type of access allowed, based on the normal UserAndGroups list versus each of the entries in the ACL 120. More particularly, the algorithm walks down the list of identifiers accumulating the rights for a given user (i.e., OR-ing the various bitmasks). Once the rights are accumulated, the user is given the accumulated rights. However, if during the walkthrough a deny entry is found that matches a user or group identifier and the requested rights, access is denied.

A restricted token is created from an existing access token (either restricted or unrestricted), and has less access than (i.e., has a subset of the rights and privileges of) a user's normal token. As used herein, a user's "normal" token is that which grants access solely based one the identity of the user (via users or groups), with no additional restrictions placed thereon. A restricted token may not allow access to a resource via one or more user or group security IDs specially marked as "USE_FOR_DENY_ONLY," even though the user's normal token allows access via those SIDs, and/or may have privileges removed that are present in the user's normal token. As also described below, if the restricted token includes any restricted security IDs, the token is subject to an additional access check wherein the restricted security IDs are compared against the entries in the object's ACL.

In accordance with one aspect of the invention, an access token is created for a user based on both the identity of the user and the location from which the user is connecting. In general, the less trustworthy the location, the more the token is restricted as to the resources the associated process may access and/or the actions it may perform on those resources. For example, a user that is connected via a LAN may have a normal token associated with that user's processes, while the same user connected via RAS may have his or her processes associated with a restricted token that is stripped of all privileges.

As mentioned above, one way in which to reduce access is to change an attribute of one or more user and/or group security identifiers in a restricted token so as to be unable to allow access, rather than grant access therewith. Security IDs marked USE_FOR_DENY_ONLY are effectively ignored for purposes of granting access, however, an ACL that has a "DENY" entry for that security ID will still cause access to be denied. By way of example, if the Group$_2$ security ID in the restricted token 124 (FIG. 8) is marked USE_FOR_DENY_ONLY, when the user's process attempts to access an object 112 having the ACL 120 that lists Group$_2$ as allowed, that entry is effectively ignored and the process will have to gain access by some other security ID. However, if the ACL 80 includes an entry listing Group$_2$ as DENY with respect to the requested type of action, then once tested, no access will be granted regardless of other security IDs.

As can be appreciated, this provides a server with the ability to restrict a user's or group's access to an object based on the location of the user. As described above, the IP address range may be specified based on the user's location, e.g., trust level zero if connecting to the local machine, trust level one if connecting from the intranet or other trusted site, level two if via RAS from an authorized telephone number, and level three otherwise. This range of addresses is then examined to mark certain groups as USE_FOR_DENY_ONLY.

By way of example, consider a user identified as UserX having a normal access token including a "TopSecret" SID, a "Confidential" SID, and an "Employee" SID, each of which grant access to TopSecret, Confidential and Employee files (based on their ACLs) respectively. If UserX is at trust level zero, UserX's normal token is used and there are no location-based restrictions placed thereon. However if at trust level one, then the TopSecret SID is marked USE_FOR_DENY_ONLY in UserX's access token. Similarly, if at trust level two, then both the TopSecret SID and the Confidential SID are marked USE_FOR_DENY_ONLY, while if at level three then the TopSecret SID, the Confidential SID and the Employee SID are marked USE_FOR_DENY_ONLY. Note that access to objects cannot be safely reduced by simply removing a security ID from a user's token, since that security ID may be marked as "DENY" in the ACL of some objects, whereby removing that identifier would grant rather than deny access to those objects. Moreover, no mechanism is provided to turn off this USE_FOR_DENY_ONLY security check.

Another way to reduce access in a restricted token is to remove one or more privileges relative to the parent token. For example, a user having a normal token with administrative privileges may be restricted via the location-based system of the present invention such that unless the user is directly connected to the local machine 60, the user's processes will run with a restricted token having no or in some way reduced privileges. As can be appreciated, the privileges that remain may also be based on levels of trust, e.g., all privileges if local (level zero), some if level one, none if level two or three.

Yet another way to reduce a token's access based on the user's location is to add restricted security IDs thereto. Restricted security IDs are numbers representing processes, resource operations and the like, made unique such as by adding a prefix to GUIDs or numbers generated via a cryptographic hash or the like, and may include information to distinguish these Security IDs from other Security IDs. As described below, if a token includes any restricted security IDs, the token is subject to an additional access check wherein the restricted security IDs are compared against the entries in the object's ACL. Thus, for example, a Restricted SID may specify "RAS," whereby unless an object's ACL has a "RAS" entry, the user will be denied access to that object.

As shown in FIG. 8, restricted security IDs are placed in a special field 122 of a restricted token 124, and, in accordance with the present invention, may identify a location from which a process is requesting an action. As described in more detail below, by requiring that both at least one user (or group) security ID and at least one restricted security ID be granted access to an object, an object may selectively grant access based on that location (as well as a user or group). Moreover, each of the locations may be granted different access rights.

The design provides for significant flexibility and granularity within the context of a user to control what a user is allowed to do from a given location. By way of example, consider the above example wherein users connecting from the local machine are level zero trusted, users connecting from the intranet and trusted sites are level one trusted, users connecting from authorized phone numbers (through RAS) and the Internet are level two trusted and users connecting from restricted sites or unauthorized phone numbers are level three trusted. Then, based on the user's location, (e.g., as ascertained from the user's IP address), level zero through level three trusts may been defined according to some predetermined policy to run as follows:

| Level | Restrictions in Security Context |
|---|---|
| 0 | No additional restrictions are placed on the user's security context |
| 1 | Users operate under restricted context, such as with privileges removed from highly sensitive operations, e.g., Backup/Restore. |
| 2 | Users operate under restricted context with all SIDs still enabled, but no privileges. |
| 3 | Users operate under restricted context, which has all SIDs disabled using the USE_FOR_DENY_ONLY bit, except, e.g., constant ones such as Everyone and Authenticated Users. All privileges are removed as in Level 2. |

To create a restricted token from an existing token, an application programming interface (API) is provided, named NtFilterToken, as set forth below:

```
NTSTATUS
NtFilterToken (
    IN HANDLE ExistingTokenHandle,
    IN ULONG Flags,
    IN PTOKEN_GROUPS SidsToDisable OPTIONAL,
    IN PTOKEN_PRIVILEGES PrivilegesToDelete OPTIONAL,
    IN PTOKEN_GROUPS RestrictingSids OPTIONAL,
    OUT PHANDLE NewTokenHandle
    );
```

The NtFilterToken API is wrapped under a Win32 API named CreateRestrictedToken, further set forth below:

```
WINADVAPI
BOOL
APIENTRY
CreateRestrictedToken (
    IN HANDLE ExistingTokenHandle,
    IN DWORD Flags,
    IN DWORD DisableSidCount,
    IN PSID_AND_ATTRIBUTES SidsToDisable OPTIONAL,
    IN DWORD DeletePrivilegeCount,
    IN PLUID_AND_ATTRIBUTES PrivilegesToDelete OPTIONAL,
```

-continued

```
    IN DWORD RestrictedSidCount,
    IN PSID_AND_ATTRIBUTES SidsToRestrict OPTIONAL,
    OUT PHANDLE NewTokenHandle
    );
```

Figure 7:
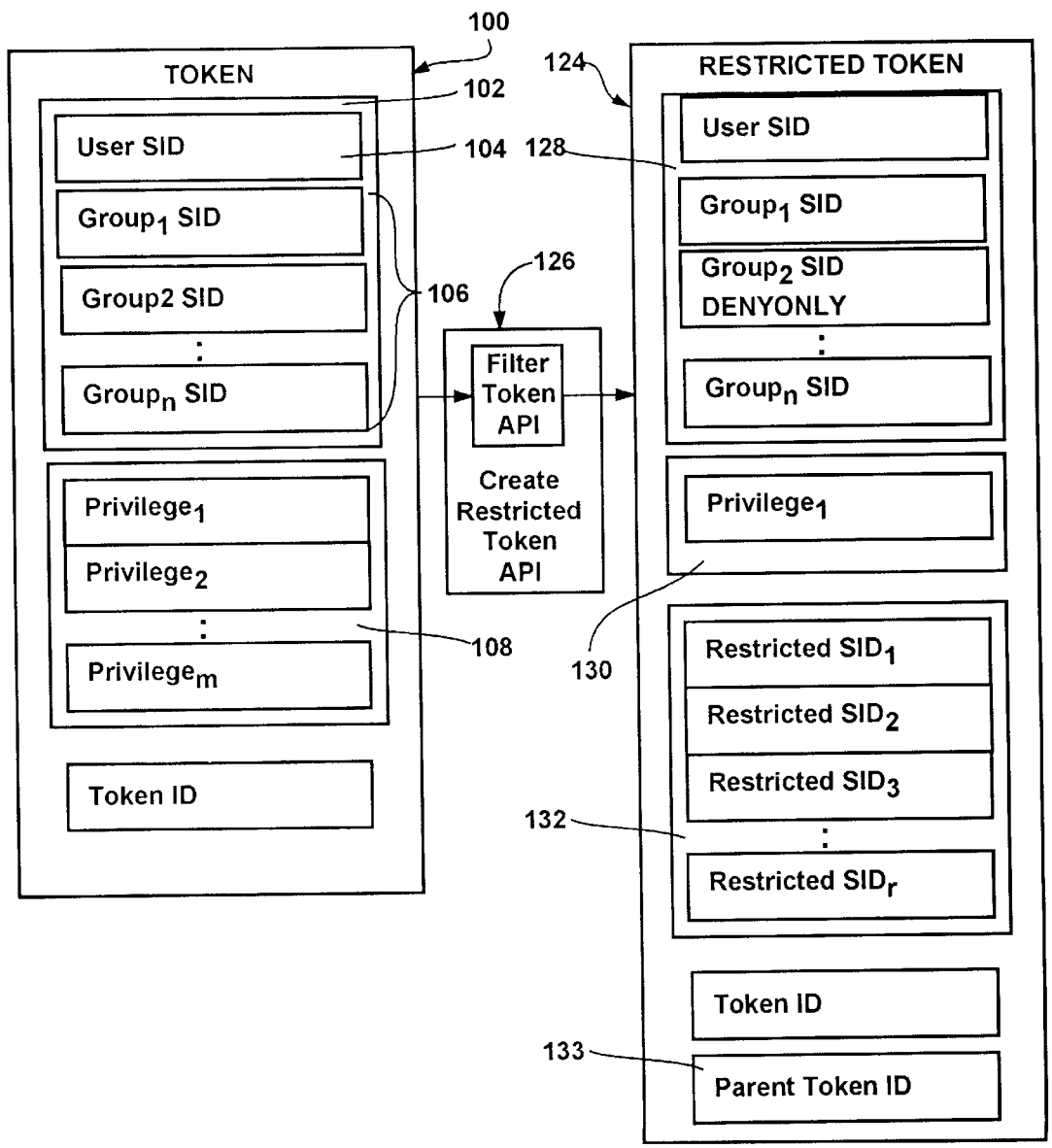
FIG. 7 is a block diagram generally representing the creation of a restricted token from an existing token in accordance with one aspect of the present invention.
Figure 9A:
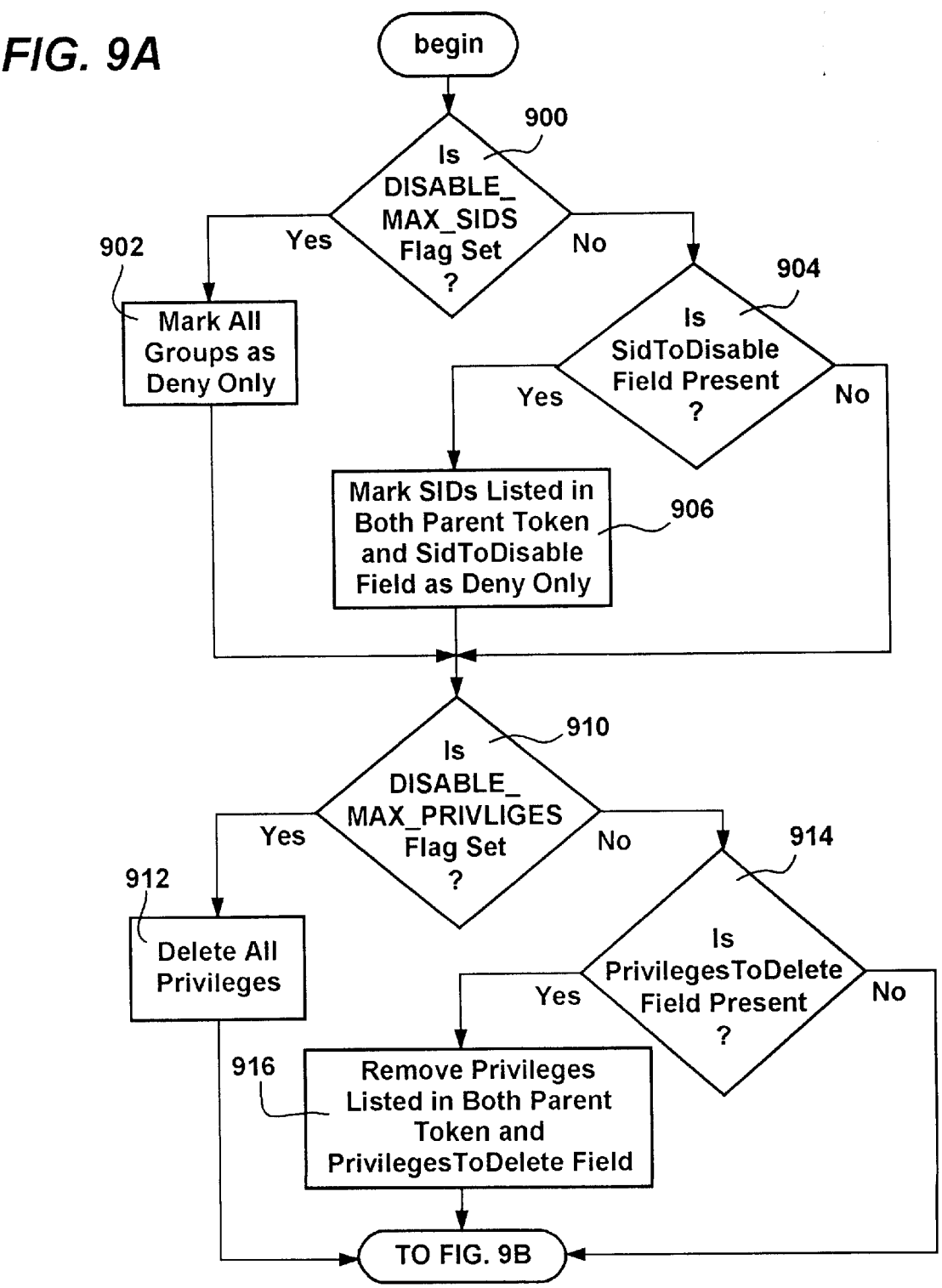
FIGS. 9A–9B comprise a flow diagram representing the general steps taken to create a restricted token from an existing token in accordance with one aspect of the present invention.
Figure 9B:
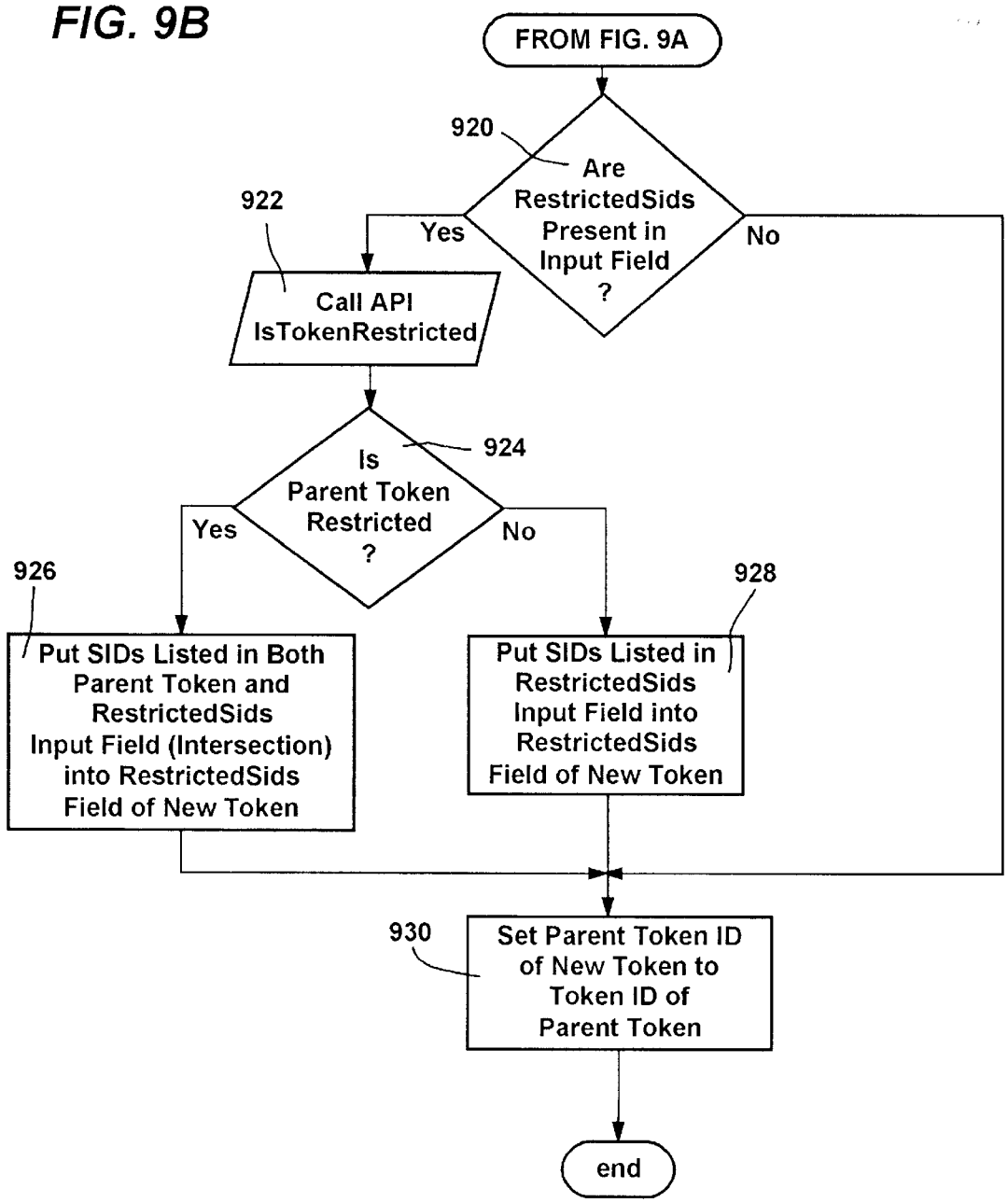

As represented in FIGS. 7 and 9A–9B, these APIs 126 work in conjunction to take an existing token 100, either restricted or unrestricted, and create a modified (restricted) token 124 therefrom. The structure of a restricted token, which contains the identification information about an instance of a logged-on user, includes three new fields corresponding to restrictions, ParentTokenId, RestrictedSidCount, and RestrictedSids, shown in boldface below:

```
Typedef struct_TOKEN {
    TOKEN_SOURCE TokenSource;          // Ro: 16-Bytes
    LUID TokenId;                      // Ro: 8-Bytes
    LUID AuthenticationId;             // Ro: 8-Bytes
    LUID ParentTokenId;                // Ro: 8-Bytes
    LARGE_INTEGER ExpirationTime;      // Ro: 8-Bytes
    LUID ModifiedId;                   // Wr: 8-Bytes
    ULONG UserAndGroupCount;           // Ro: 4-Bytes
    ULONG RestrictedSidCount;          // Ro: 4-Bytes
    ULONG PrivilegeCount;              // Ro: 4-Bytes
    ULONG VariableLength;              // Ro: 4-Bytes
    ULONG DynamicCharged;              // Ro: 4-Bytes
    ULONG DynamicAvailable;            // Wr: 4-Bytes (Mod)
    ULONG DefaultOwnerIndex;           // Wr: 4-Bytes (Mod)
    PSID_AND_ATTRIBUTES                // Wr: 4-Bytes (Mod)
        UserAndGroups;
    PSID_AND_ATTRIBUTES RestrictedSids; // Ro: 4-Bytes
    PSID PrimaryGroup;                 // Wr: 4-Bytes (Mod)
    PLUID_AND_ATTRIBUTES Privileges;   // Wr: 4-Bytes (Mod)
    PULONG DynamicPart;                // Wr: 4-Bytes (Mod)
    PACL DefaultDacl;                  // Wr: 4-Bytes (Mod)
    TOKEN_TYPE TokenType;              // Ro: 1-Byte
    SECURITY_IMPERSONATION_LEVEL
        ImpersonationLevel;            // Ro: 1-Byte
    UCHAR TokenFlags;                  // Ro: 4-Bytes
    BOOLEAN TokenInUse;                // Wr: 1-Byte
    PSECURITY_TOKEN_PROXY_DATA         // Ro: 4-Bytes
        ProxyData;
    PSECURITY_TOKEN_AUDIT_DATA         // Ro: 4-Bytes
        AuditData;
    ULONG VariablePart;                // Wr: 4-Bytes (Mod)
} TOKEN, * PTOKEN;
```

Note that when a normal (non-restricted) token is now created, via a CreateToken API, the RestrictedSids field is empty, as is the ParentTokenId field.

To create a restricted token 124, a process calls the CreateRestrictedToken API with appropriate flag settings and/or information in the input fields, which in turn invokes the NtFilterToken API. As represented beginning at step 900 of FIG. 9A, the NtFilterToken API checks to see if a flag named DISABLE_MAX_SIDS is set, which indicates that all Security IDs for groups in the new, restricted token 124 should be marked as USE_FOR_DENY_ONLY. The flag provides a convenient way to restrict the (possibly many) groups in a token without needing to individually identify each of the groups. If the flag is set, step 900 branches to step 902 which sets a bit indicating USE_FOR_DENY_ONLY on each of the group security IDs in the new token 124.

If the DISABLE_MAX_SIDS flag is not set, then step 900 branches to step 904 to test if any security IDs are individually listed in a SidsToDisable Field of the NtFilterToken API. As shown at step 904 of FIG. 9A, when the optional SidsToDisable input field is present, at step 906, any Security IDs listed therein that are also present in the UserAndGroups field 102 of the parent token 100 are individually marked as USE_FOR_DENY_ONLY in the UserAndGroups field 128 of the new restricted token 124. As described above, such Security IDs can only be used to deny access and cannot be used to grant access, and moreover, cannot later be removed or enabled. Thus, in the example shown in FIG. 7, the $Group_2$ security ID is marked as USE_FOR_DENY_ONLY in the restricted token 124 by having specified the $Group_2$ security ID in the SidsToDisable input field of the NtFilterToken API 126.

The filter process then continues to step 910 of FIG. 9A, wherein a flag named DISABLE_MAX_PRIVILEGES is tested. This flag may be similarly set as a convenient shortcut to indicate that all privileges in the new, restricted token 124 should be removed. If set, step 910 branches to step 912 which deletes all privileges from the new token 124.

If the flag is not set, step 910 branches to step 914 wherein the optional PrivilegesToDelete field is examined. If present when the NtFilterToken API 126 is called, then at step 916, any privileges listed in this input field that are also present in the privileges field 108 of the existing token 100 are individually removed from the privileges field 130 of the new token 124. In the example shown in FIG. 7, the privileges shown as "$Privilege_2$" to "$Privilege_m$" have been removed from the privileges field 130 of the new token 124 by having specified those privileges in the PrivilegesToDelete input field of the NtFilterToken API 126. In keeping with one aspect of the present invention, as described above, this provides the ability to reduce the privileges available in a token based on the location of a user. The process continues to step 920 of FIG. 9B.

When creating a restricted token 124, if SIDs are present in the RestrictingSids input field at step 920, then a determination is made as to whether the parent token is a normal token or is itself a restricted token having restricted SIDs. An API, IsTokenRestricted is called at step 922, and resolves this question by querying (via the NtQueryInformationToken API) the RestrictingSids field of the parent token to see if it is not NULL, whereby if not NULL, the parent token is a restricted token and the API returns a TRUE. If the test is not satisfied, the parent token is a normal token and the API returns a FALSE. Note that for purposes of the subsequent steps 926 or 928, a parent token that is restricted but does not have restricted SIDs (i.e., by having privileges removed and/or USE_FOR_DENY_ONLY SIDs) may be treated as being not restricted.

At step 924, if the parent token has restricted SIDs, step 924 branches to step 926 wherein any security IDs that are in both the parent token's restricted Security ID field and the API's restricted Security ID input list are put into the restricted Security ID field 132 of the new token 124. Requiring restricted security IDs to be common to both lists prevents a restricted execution context from adding more security IDs to the restricted Security ID field 132, an event which would effectively increase rather than decrease access. Similarly, if none are common at step 426, any token created still has to be restricted without increasing the access thereof, such as by leaving at least one restricted SID from the original token in the new token. Otherwise, an empty restricted SIDs field in the new token might indicate that the token is not restricted, an event which would effectively increase rather than decrease access.

Alternatively, if at step 924 the parent token is determined to be a normal token, then at step 928 the RestrictingSids field 132 of the new token 124 is set to those listed in the input field. Note that although this adds security IDs, access is actually decreased since a token having restricted SIDs is subject to a secondary access test, as described in more detail below.

Lastly, step 930 is also executed, whereby the Parent-TokenId 93 in the new token 124 is set to the TokenId of the existing (parent) token. This provides the operating system with the option of later allowing a process to use a restricted version of its token in places that would not normally be allowed except to the parent token.

Figure 10:
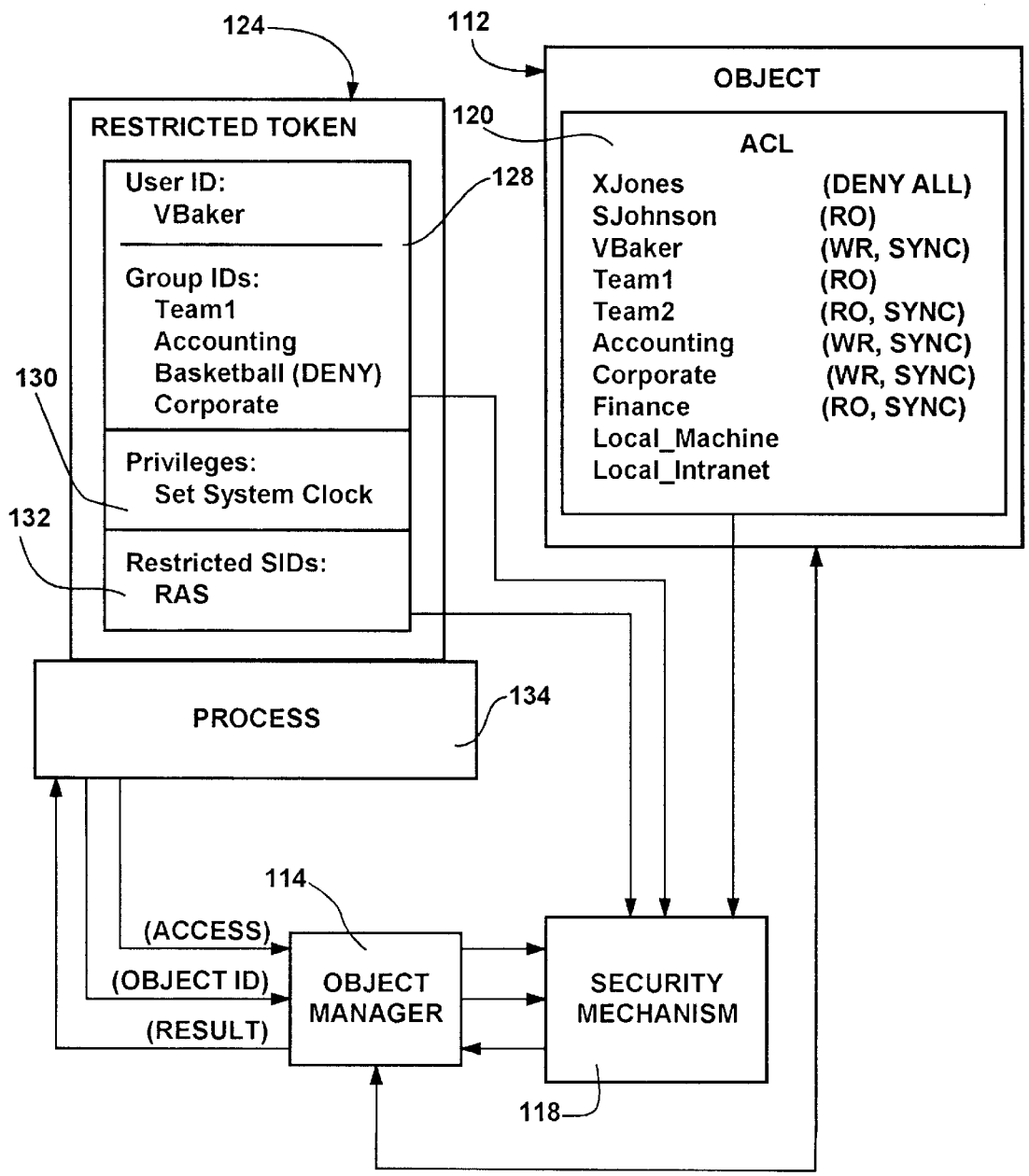
FIG. 10 is a block diagram generally representing a process having a restricted token associated therewith attempting to access a resource in accordance with one aspect of the present invention.
Figure 11:
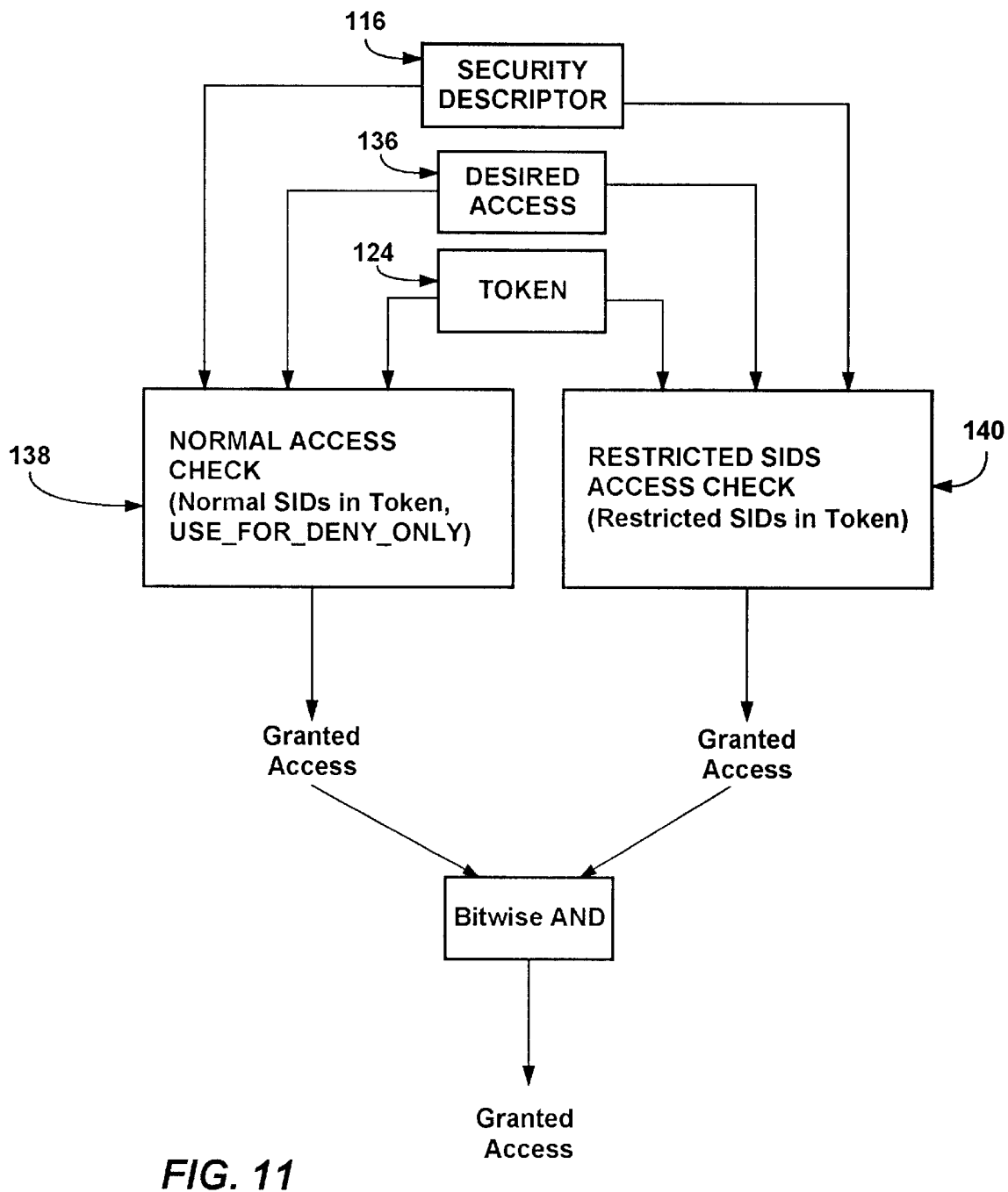
FIG. 11 is a block diagram generally representing the logic for determining access to an object of a process having a restricted token associated therewith in accordance with an aspect of the present invention.
Figure 12:
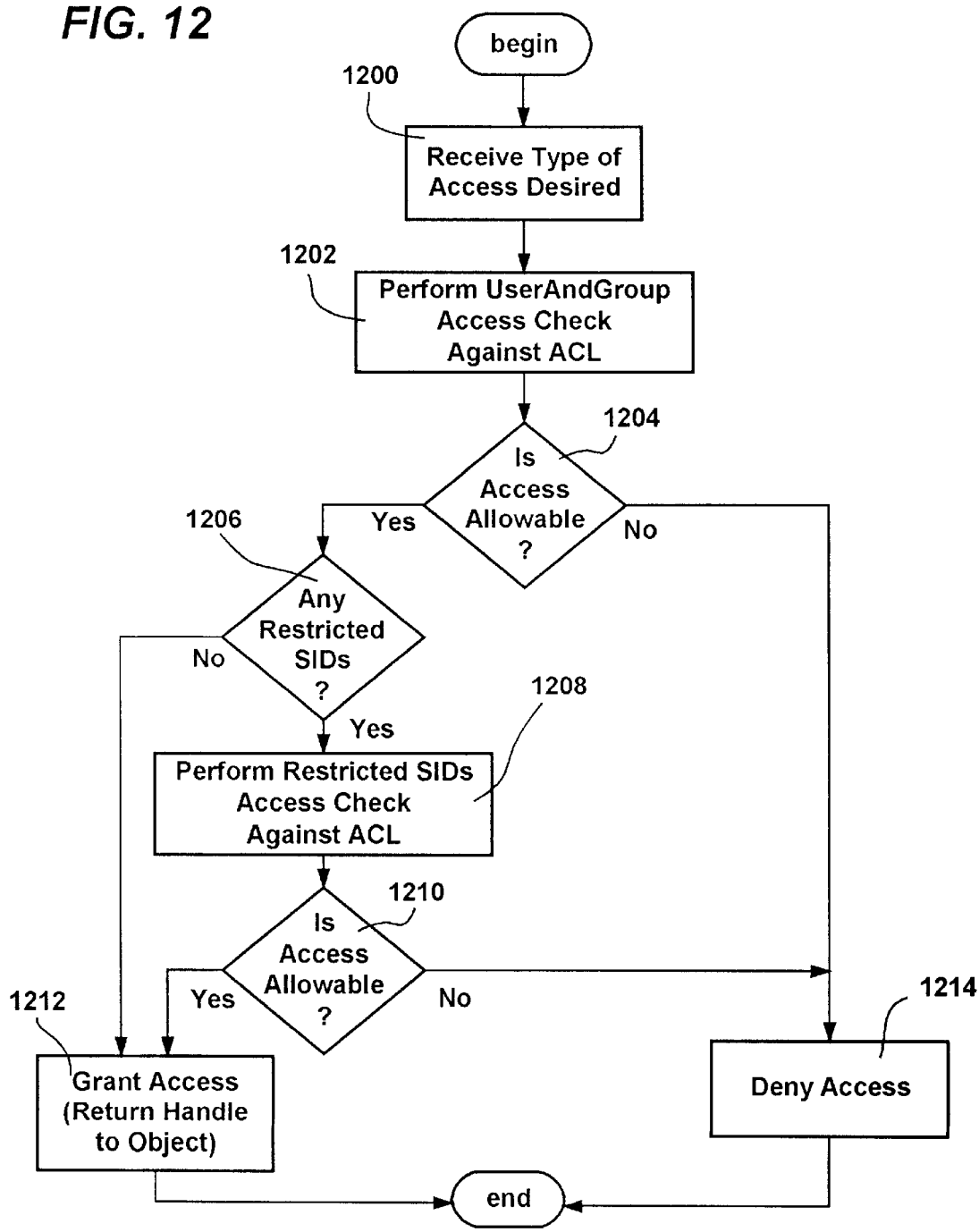
FIG. 12 is a flow diagram representing the general steps taken when determining whether to grant a process access to a resource in accordance with an aspect of the present invention.

Turning an explanation of the access evaluation with particular reference to FIGS. 10–12, as represented in FIG. 10, a restricted process 134 has been created and is attempting to open a file object 110 with read/write access. In the security descriptor of the object 112, the ACL 120 has a number of security IDs listed therein along with the type of access allowed for each ID, wherein "RO" indicates that read only access is allowed, "WR" indicates read/write access and "SYNC" indicates that synchronization access is allowed. Note that "XJones" is specifically denied access to the object 72, even if "XJones" would otherwise be allowed access through membership in an allowed group. Moreover, the process 94 having this token 84 associated therewith will not be allowed to access any object via the "Basketball" security ID in the token 84, because this entry is marked "DENY" (i.e., USE_FOR_DENY_ONLY).

As represented in FIG. 10, restricted security contexts are primarily implemented in the Windows NT kernel. To attempt to access the object 112, the process 134 provides the object manager 114 with information identifying the object to which access is desired along with the type of access desired, (FIG. 12, step 1200). In response, as represented at step 1202, the object manager 114 works in conjunction with the security mechanism 118 to compare the user and group security IDs listed in the token 124 (associated with the process 134) against the entries in the ACL 120, to determine if the desired access should be granted or denied.

As generally represented at step 1204, if access is not allowed for the listed user or groups, the security check denies access at step 1214. However, if the result of the user and group portion of the access check indicates allowable access at step 1204, the security process branches to step 1206 to determine if the restricted token 124 has any restricted security IDs. If not, there are no additional restrictions, whereby the access check is complete and access is granted at step 1212 (a handle to the object is returned) based solely on user and group access. In this manner, a normal token is essentially checked as before. However, if the token includes restricted security IDs as determined by step 1206, then a secondary access check is performed at step 1208 by comparing the restricted security IDs against the entries in the ACL 120. If this secondary access test allows access at step 1210, access to the object is granted at step 1212. If not, access is denied at step 1214.

As logically represented in FIG. 11, a two-part test is thus performed whenever restricted Security IDs are present in the token 124. Considering the security IDs in the token 124 and the desired access bits 136 against the security descriptor of the object 112, both the normal access test and (bitwise AND) the restricted security IDs access test must grant access in order for the user's process to be granted access to the object. As described above, the normal access test proceeds first, and if access is denied, no further testing is necessary. Note that access may be denied either because no security ID in the token matched an identifier in the ACL, or because an ACL entry specifically denied access to the token based on a security identifier therein. Alternatively, a token may be arranged to have multiple sets of restricted SIDS, with a more complex Boolean expression covering the evaluation of those SIDS, e.g., grant access if set A OR (set B AND set C) allow access.

Thus, in the example shown in FIG. 10, no access to the object 112 will be granted to the process 134 because the only Restricted SID in the token 124 (field 132) identifies "RAS" while there is no counterpart restricted SID in the object's ACL 120. Although the user had the right to access the object via a process running with a normal token, the process 134 was restricted so as to only be able to access objects having a "RAS" SID (non-DENY) in their ACLs.

Note that instead of specifying a type of access, the caller may have specified MAXIMUM_ALLOWED access, whereby as described above, an algorithm walks through the ACL 80 determining the maximum access. With restricted tokens, if any type of user or group access at all is granted, the type or types of access rights allowable following the user and groups run is specified as the desired access for the second run, which checks the RestrictedSids list. In this way, a restricted token is certain to be granted less than or equal to access than the normal token.

Lastly, it should be noted that access tokens may be further restricted according to criteria other than just location-based criteria. Indeed, restricted tokens allow the setting up of restricted security contexts based on other criteria including the identity of the process (e.g., Microsoft Excel) that is attempting to access a resource. Moreover, the various criteria may be combined to determine access rights. Thus, for example, RAS access to a network file may be allowed if a user is opening the file via Microsoft Excel, but not via Microsoft Word. As can be appreciated, a virtually limitless number of location-based combinations with other criteria for security discrimination are feasible.

Authentication

Figure 13:
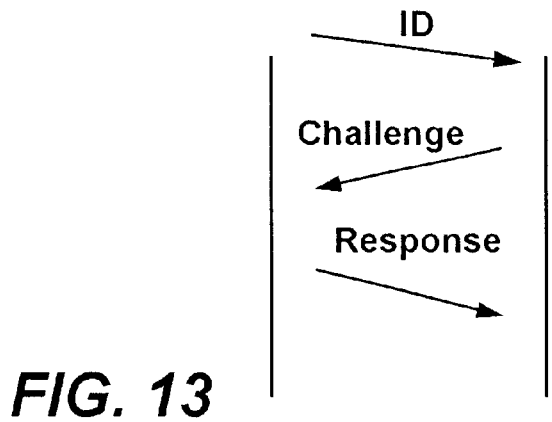
FIG. 13 is a diagram representing the communication between a client a server in a challenge—response authentication protocol.
Figure 14:
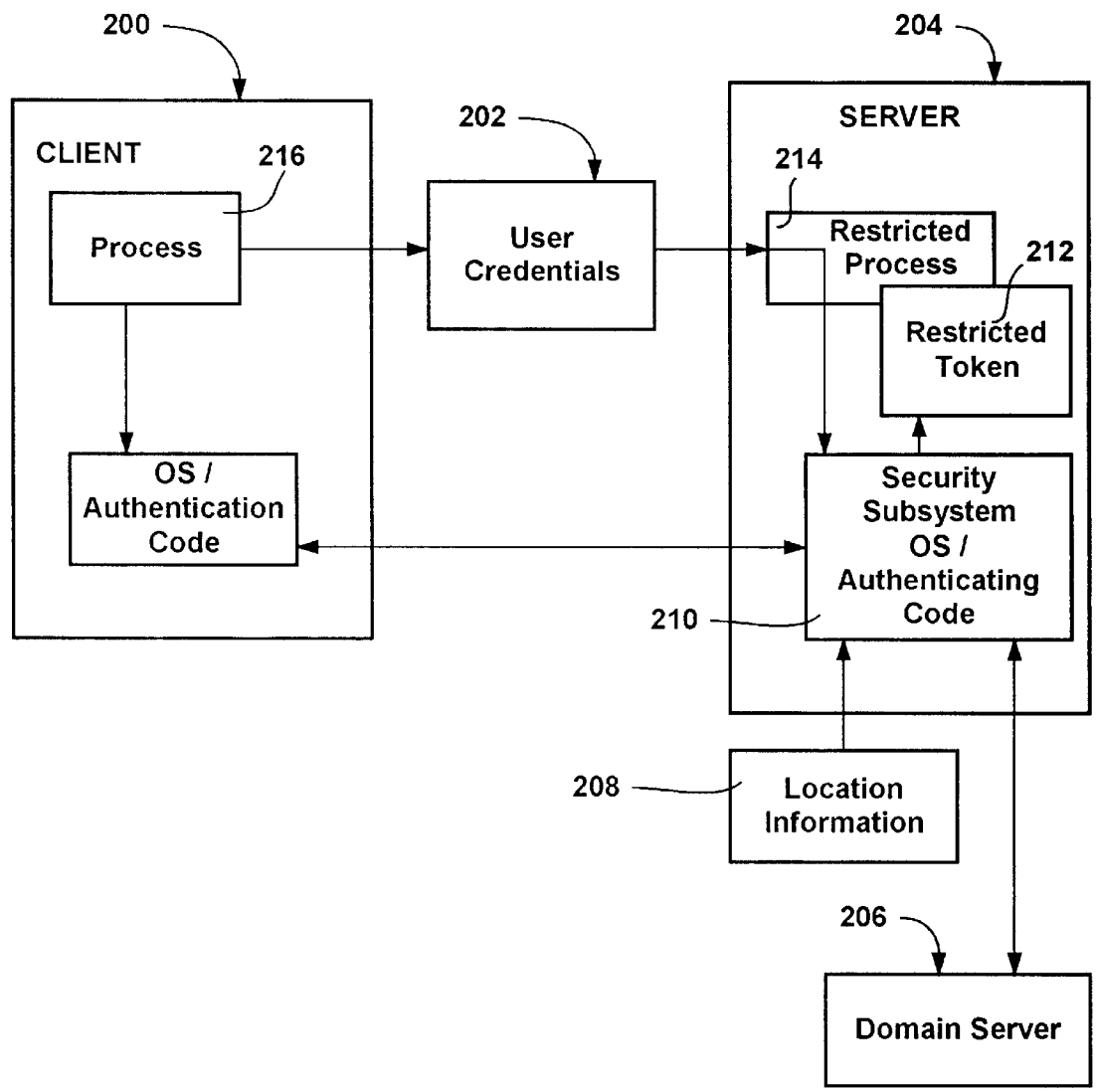
FIG. 14 is a block diagram representing the creation of a restricted token based on authentication credentials and location discrimination in accordance with one aspect of the present invention.

In accordance with one aspect of the present invention, when a client connects to a server, the server authenticates the client and builds a token for that user based on the client's identity and location information. For example, as shown in FIGS. 13 and 14, in one well-known type of authentication (i.e., NTLM), the client user 200 provides credentials 202 including a user ID to a server 204, which then communicates with a domain server 206 to create a challenge for that user based on the user's stored encrypted password. As represented in FIG. 13, the server 204 returns the challenge to the client 202, and if the client properly responds, the user is authenticated.

In keeping with the present invention, however, rather than simply building a normal token for the user, the user information is combined with the location information 208 by a security subsystem/provider 210 to create a restricted token 212 as described in detail above. The restricted token 212 is associated with each process 214 run at the server 204 on behalf of any client process 216.

Figure 15:
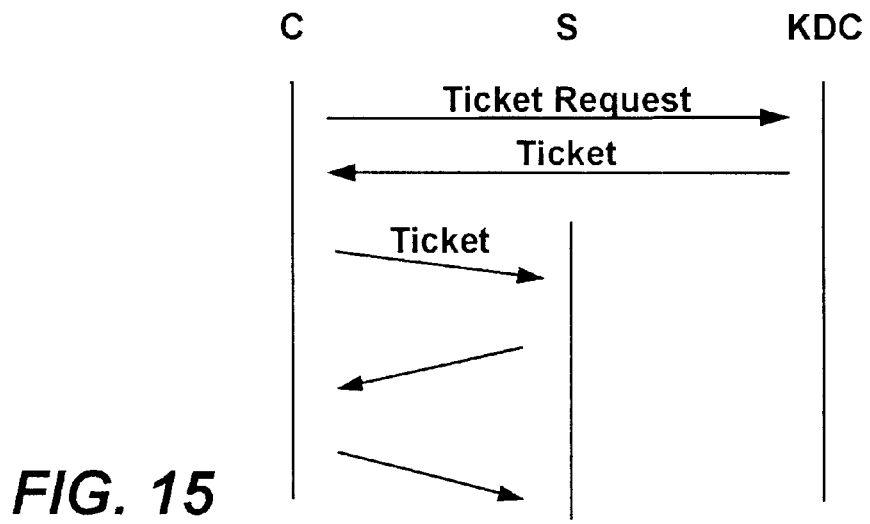
FIG. 15 is a diagram representing the communication for authenticating a client at a server according to the Kerboros authentication protocol.
Figure 16:
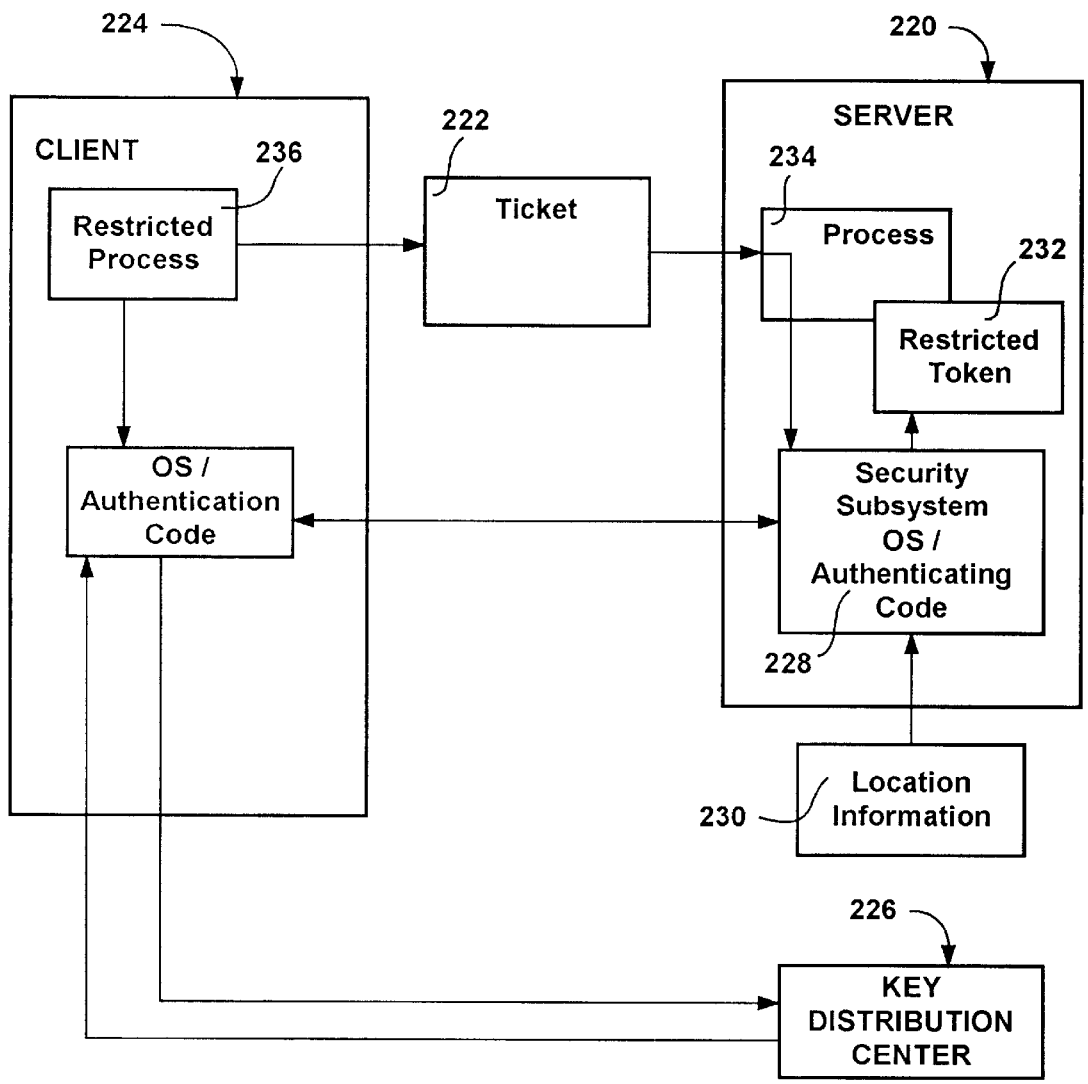
FIG. 16 is a block diagram representing the creation of a restricted token based on an authentication ticket and location discrimination in accordance with one aspect of the present invention.

As shown in FIGS. 15 and 16, other authentication protocols including the Kerboros protocol may also be used in conjunction with the present invention. According to the Kerberos protocol, authentication of the connection to the server 220 is accomplished via a ticket 222. The ticket 222 is initially received by the client 224 from a ticket-issuing facility on the network known as a Key Distribution Center (KDC) 226. The ticket 222 is re-useable for a period of time, whereby even if the session is terminated, the client 130 does not have to repeat the authentication process while the ticket 222 is still valid.

In keeping with the invention, the information in the ticket 222 (which may include restrictions placed therein by the client 224) is combined by the server's security subsystem/ provider 228 with user location information 230 to create a restricted token 232, as described in detail above. The restricted token 232 is associated with each process 234 run at the server 220 on behalf of any client process 236.

Figure 17:
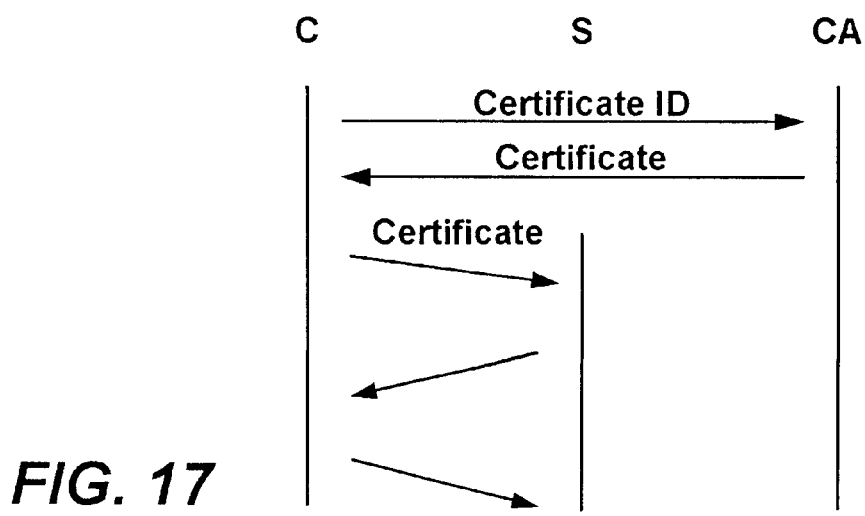
FIG. 17 is a diagram representing the communication for authenticating a client at a server according to the SSL protocol.
Figure 18:
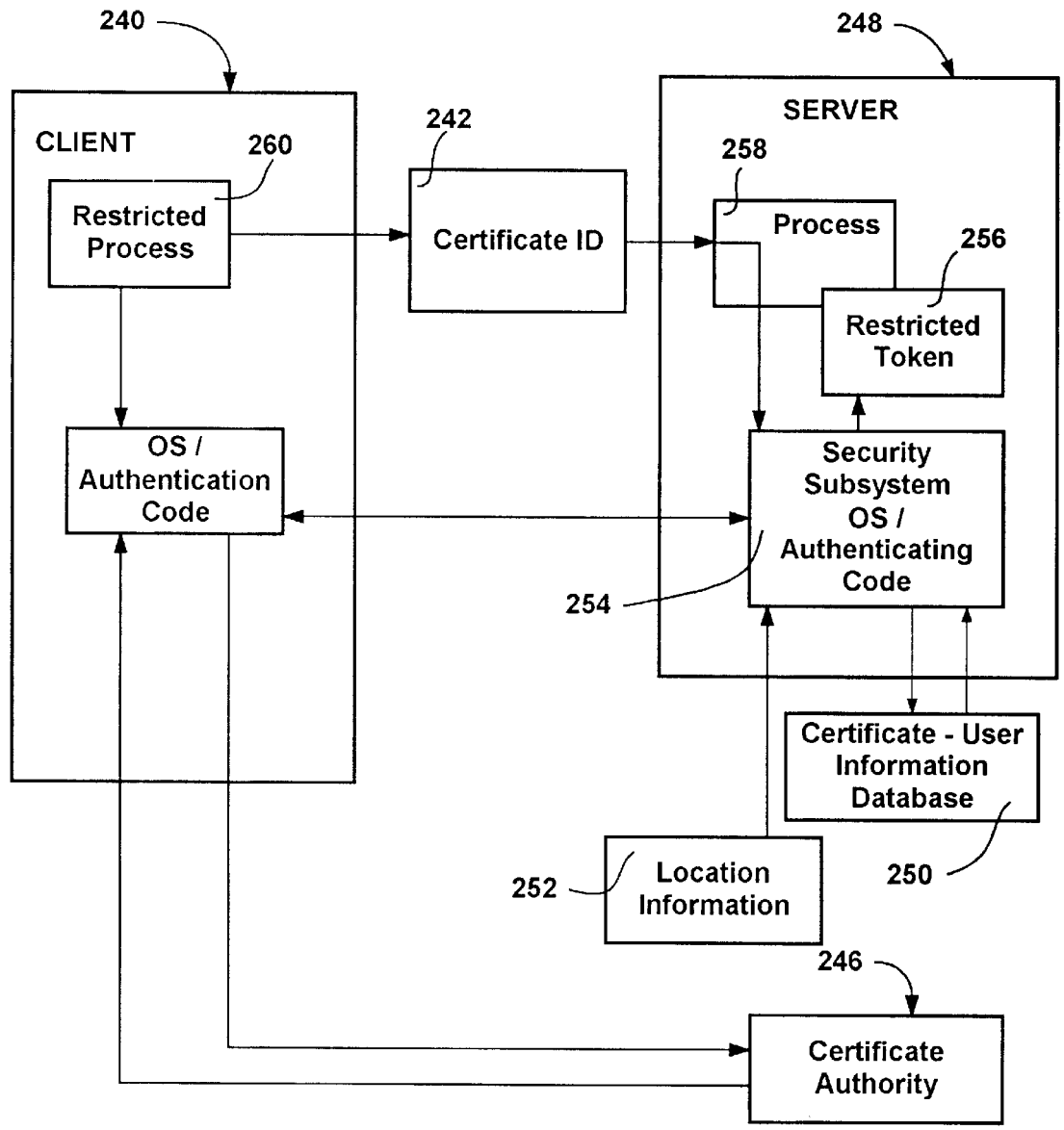
FIG. 18 is a block diagram representing the creation of a restricted token based on an authentication certificate and location discrimination in accordance with one aspect of the present invention.

Similarly, FIGS. 17 and 18, show another authentication protocol known as SSL. In SSL, the client user 240 first obtains a certificate ID 242 from a certificate authority 246 using public key-based authentication. Assuming a server 248 trusts the certificate authority 246, the client user 240 may use the certificate ID 242 to gain access to the server 248. As represented in FIG. 17, back-and-forth communications take place between the server 248 and client 240 via which the server is able to prove that the certificate ID 242 belongs to the proper user.

The certificate ID 242 includes user information identifying that user as one having an account with the network to which the server 248 is connected. The information is used to access a database 250 having user information (e.g., security ID, group IDs privileges and so on) maintained for the user therein. Then, in accordance with the present invention, the user information from the database 250 is combined with location information 252 by the server's security subsystem/provider 254 to create a restricted token 256 as described in detail above. The restricted token 256 is associated with each process 258 run at the server 248 on behalf of any client process 260.

As can be appreciated, the user information obtained via these and other authentication protocols may be combined with location information to restrict a user's access to resources. Moreover, the type of authentication itself may be made dependent on the location of the user. For example, to increase security, a remote connection may require Kerboros or SSL authentication, while a challenge—response authentication may be sufficient to authenticate a user connecting via a local connection. Since the server has access to the location information, the server may decide the type of authentication required for a particular location. Similarly, the type of authentication may be used to discriminate access rights. For example, the access rights of SSL users may be restricted in one way, Kerboros users in another way and NTLM users in still another way. In the manner described above, restricted tokens provide a convenient mechanism to implement restricted security contexts based on a user's virtual location and/or type of authentication, although other enforcement mechanisms are feasible.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computer network wherein a user may selectively connect to the network from one of a plurality of virtual locations, a method of providing improved network security, comprising the steps of, determining a location from where the user is connecting, selecting an access level for the user from at least two distinct access levels based on criteria including the virtual location, connecting the user to the network, creating a restricted token that has reduced access relative to a parent token, the restricted token derived from the parent token and information including the access level, and determining access of the user to network resources based on information in the restricted token.

2. The method of claim 1 further comprising assigning an Internet protocol address to the user, the assigned address dependent on the location from where the user is connecting.

3. The method of claim 1 wherein determining a location from where the user is connecting comprises evaluating an Internet protocol address assigned to the user.

4. The method of claim 3 wherein selecting an access level from at least two distinct access levels includes selecting the access level according to the Internet protocol address.

5. The method of claim 1 wherein determining a location from where the user is connecting comprises determining that the user is connecting to the network via a remote access server.

6. The method of claim 5 further comprising determining whether the user is connecting via a dial-up connection.

7. The method of claim 6 wherein the user is determined to be connecting via a dial-up connection, and further comprising determining the telephone number from which the user is connecting, comparing the telephone number to a list of registered users, and wherein selecting an access level includes selecting one level if the telephone number is in the list and another level if the number is not in the list.

8. The method of claim 1 wherein determining a location from where the user is connecting comprises determining whether the user is connecting to the network via a remote access server, and if the user is connecting via a remote access server, selecting an access level includes selecting an access level corresponding to more restricted access rights.

9. The method of claim 1 wherein determining a location from where the user is connecting comprises determining that the user is connecting to the network via an intranet.

10. The method of claim 1 wherein determining a location from where the user is connecting comprises determining that the user is connecting to the network via a virtual private network.

11. The method of claim 1 wherein determining access to network resources based on information in the restricted token includes determining access based on credentials of the user.

12. The method of claim 1 wherein creating the restricted token for the user includes adding at least one restricted security identifier thereto relative to the parent token.

13. The method of claim 1 wherein the restricted token is associated with each process of the user, and wherein determining access to network resources includes comparing information in the restricted token against security information associated with each network resource.

14. The method of claim 1 wherein creating the restricted token includes removing at least one privilege from the restricted token relative to the parent token.

15. The method of claim 1 wherein creating the restricted token includes creating the restricted token from the user's normal token, and changing attribute information of a security identifier in the restricted token to use for deny only access via that security identifier, relative to attribute information of a corresponding security identifier in the normal token.

16. The method of claim 1 wherein connecting the user to the network includes authenticating the user via a challenge—response protocol.

17. The method of claim 1 wherein connecting the user to the network includes receiving a ticket from the user, the ticket issued by a ticket-issuing facility.

18. The method of claim 1 wherein connecting the user to the network includes receiving a certificate from the user, the certificate issued by a certificate authority.

19. The method of claim 1 wherein creating the restricted token includes creating the restricted token from the user's normal token, including removing at least one privilege from the restricted token relative to the parent token and adding at least one restricted security identifier to the restricted token.

20. The method of claim 12 wherein determining access to network resources includes comparing user information in the restricted token including the at least one restricted security identifier therein against security information associated with each network resource.

21. In a computer network wherein a user may selectively connect to the network from one of a plurality of virtual locations, a system for providing improved network security, comprising, a discrimination mechanism configured to determine a virtual location from where the user is connecting and to select an access level from at least two distinct access levels based thereon, a security provider configured to create a restricted token including information from a parent token associated with the user and information including the access level, the restricted token having less access rights relative to the parent token, and an enforcement mechanism configured to determine user access to network resources according to the restricted token.

22. The system of claim 21 wherein the discrimination mechanism assigns an Internet protocol address to the user based on the virtual location determined thereby.

23. The system of claim 21 wherein the discrimination mechanism evaluates an Internet protocol address assigned to the user.

24. The system of claim 23 wherein the discrimination mechanism selects the access level according to the Internet protocol address.

25. The system of claim 21 wherein the discrimination mechanism determines that the user is connecting to the network via a remote access server.

26. The system of claim 25 wherein the discrimination mechanism further determines that the user is connecting via a dial-up connection.

27. The system of claim 26 further comprising a list of registered telephone numbers and a caller-ID mechanism connected to the discrimination mechanism, and wherein the discrimination mechanism accesses the caller ID mechanism to determine a telephone number of the user, and accesses the list to determine if the telephone number is in the list, and if the telephone number is in the list, determines one access level, and if the number is not in the list, determines another access level.

28. The system of claim 21 wherein the discrimination mechanism determines whether the user is connecting to the network via a remote access server, and if the user is connecting via a remote access server, further selects an access level for the user corresponding to more restricted access rights relative to the user access rights selected for a direct connection to the network.

29. The system of claim 21 wherein the discrimination mechanism includes means for determining when the user is connecting to the network via an intranet.

30. The system of claim 21 wherein the discrimination mechanism includes means for determining when the user is connecting to the network via a virtual private network.

31. The system of claim 21 wherein the security provider sets up the access rights of the user based on information including the credentials of the user.

32. The system of claim 21 wherein the security provider creates the restricted access token by deriving information from a normal access token associated with the user.

33. The system of claim 32 wherein the restricted token is associated with each process of the user, and wherein the enforcement mechanism determines access to the network resources by comparing information in the restricted token against security information associated with each network resource.

34. In a computer server having files thereon, a method of selectively restricting access to the files, comprising, receiving a request from an entity to access a file, selecting an access level for the entity from at least two distinct access levels based on criteria including the type of entity and a virtual location of the entity, deriving a restricted token from data in a parent access token associated with the entity and data corresponding to the access level, and determining access of the entity to the file based on information in the restricted token versus an access control list associated with the file.

35. The method of claim 34 wherein the entity is a process of a remote computer system, and wherein selecting an access level for the entity from at least two distinct access levels includes assigning a first access level for processes of the local server and a second access level for processes of remote computers.

36. The method of claim 34 wherein the entity is a script running on the computer server, and wherein selecting an access level for the entity from at least two distinct access levels includes assigning a distinct access level for scripts.

37. The method of claim 34 wherein the entity is an FTP server running on the computer server, and wherein selecting an access level for the entity from at least two distinct access levels includes assigning a distinct access level for FTP servers.

38. The method of claim 34 wherein the entity is a process of a proxy, and wherein selecting an access level for the entity from at least two distinct access levels includes assigning a first access level for processes of the local server and a second access level for processes of proxies.

39. The system of claim 21 wherein the restricted token has at least one privilege removed therefrom relative to the parent token.

40. The system of claim 21 wherein the restricted token has a security identifier modified to have less access rights than a corresponding security identifier in the parent token.

41. The system of claim 21 wherein the restricted token has at least one restricted security identifier added thereto relative to the parent token.

42. A computer-readable medium having computer-executable instructions, which, when executed on a computer, perform a method comprising:
   determining a virtual location from where a remote computer is connecting to a computer network, wherein the remote computer may selectively connect to the computer network from one of a plurality of virtual locations;
   selecting an access level for the remote computer from at least two distinct access levels based on criteria including the virtual location;
   connecting the remote computer to the network;
   creating a restricted token that has reduced access relative to a parent token associated with a user of the remote computer, the restricted token derived from the parent token and information including the access level; and
   determining access of the remote computer to network resources based on information in the restricted token.

43. A computer-readable medium having computer-executable instructions, which, when executed on a computer, perform a method comprising:

receiving a request from an entity to access a file of a computer server;

selecting an access level for the entity from at least two distinct access levels based on criteria including the type of entity and a virtual location of the entity;

deriving a restricted token from data in a parent access token associated with the entity and data corresponding to the access level; and determining access of the entity to the file based on information in the restricted token versus an access control list associated with the file.

\* \* \* \* \*

UNITED STATES PATENT AND TRADEMARK OFFICE
CERTIFICATE OF CORRECTION

PATENT NO. : 6,308,273 B1
DATED : October 23, 2001
INVENTOR(S) : Goertzel et al.

It is certified that error appears in the above-identified patent and that said Letters Patent is hereby corrected as shown below:

Column 2,
Line 59, "challenge – response" should read -- challenge-response --.
Line 59, "a client a server" should read -- a client and a server --.

Column 4,
Line 66, "T1" should not be in bold font.

Column 5,
Line 22, "T1" should not be in bold font.

Column 6,
Lines 3 and 7, "trusted, IP addresses" should read -- trusted IP addresses --.
Line 37, "phone number," should read -- phone numbers, --.

Column 7,
Lines 4-5, "a third user from" should read -- a third user $70_3$ from --.

Column 8,
Line 47, "was" should read -- ways --.

Column 9,
Line 9, "User And Groups" should read -- UserAndGroups --.

Column 12,
Line 22, "been" should read -- be -- or -- have been --.

Column 13,
Line 23, "LUID ParentTokenId; // Ro: 8-Bytes" should be bold -- LUID ParentTokenId; // Ro: 8-Bytes --.
Line 27, "ULONG RestrictedSidCount; // Ro: 4-Bytes" should be bold -- ULONG RestrictedSidCount; // Ro: 4-Bytes --.
Line 33, "PSID_AND_ATTRIBUTES RestrictedSids; // Ro: 4-Bytes" should be bold -- PSID_AND_ATTRIBUTES RestrictedSids; // Ro: 4-Bytes --.

UNITED STATES PATENT AND TRADEMARK OFFICE
CERTIFICATE OF CORRECTION

PATENT NO. : 6,308,273 B1
DATED : October 23, 2001
INVENTOR(S) : Goertzel et al.

It is certified that error appears in the above-identified patent and that said Letters Patent is hereby corrected as shown below:

Column 15,
Line 11, "turning an" should read -- turning to an --.

Column 17,
Line 33, "challenge – response" should read -- challenge-response --.

Column 18,
Line 61, "challenge – response" should read -- challenge-response --.

Signed and Sealed this

Twenty-sixth Day of October, 2004

JON W. DUDAS
*Director of the United States Patent and Trademark Office*